United States Patent
Oi

(12) 
(10) Patent No.: US 6,434,220 B2
(45) Date of Patent: *Aug. 13, 2002

(54) LONG-DISTANCE TRANSMISSION SYSTEM AND DEVICE

(75) Inventor: Masakazu Oi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,325

(22) Filed: Mar. 16, 1999

(30) Foreign Application Priority Data

Mar. 18, 1998 (JP) ............................................ 10-068694

(51) Int. Cl.$^7$ ................................................ H04M 1/24
(52) U.S. Cl. .................... 379/24; 379/323; 379/390.01; 379/22; 379/32.02
(58) Field of Search ................................ 379/1, 2, 3, 4, 379/12, 22, 23, 27.01, 29, 32, 1.01, 9.06, 22.02, 22.03, 22.04, 24, 25, 26.01, 27.08, 28, 30, 32.01, 32.02, 32.04, 323, 390.01

(56) References Cited

U.S. PATENT DOCUMENTS

| | | | | |
|---|---|---|---|---|
| 4,273,963 A | * | 6/1981 | Seidel | 379/27 |
| 4,887,278 A | * | 12/1989 | Gupta | 375/7 |
| 5,343,461 A | * | 8/1994 | Barton et al. | 379/1 |
| 5,521,959 A | * | 5/1996 | Walsworth et al. | 379/27 |
| 5,848,127 A | * | 12/1998 | Levitan et al. | 379/5 |

* cited by examiner

*Primary Examiner*—Curtis Kuntz
*Assistant Examiner*—Rexford N Barnie
(74) *Attorney, Agent, or Firm*—Katten Muchin Zavis Rosenman

(57) ABSTRACT

A long-distance transmission system includes a network terminal that accommodates terminal equipment, and a line terminal connected to the network terminal via a two-wire metallic subscriber line. The network terminal includes an amplifier, which amplifies a transmission level of a transmission signal to be transmitted to the line terminal via the two-wire metallic subscriber line on the basis of a characteristic of the two-wire transmission line.

29 Claims, 17 Drawing Sheets

SELECTOR SWITCH SIGNAL

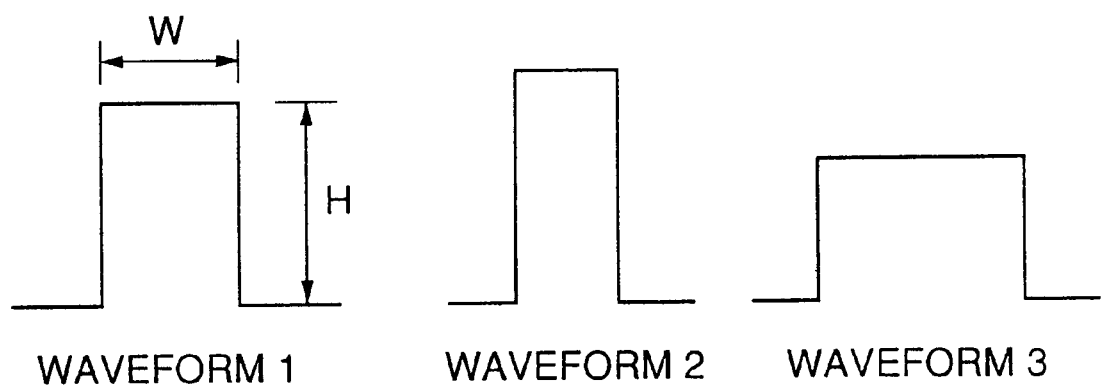

LONG-DISTANCE TRANSMISSION SYSTEM AND DEVICE

BACKGROUND OF THE INVENTION

1. Field of the Invention

The present invention generally relates to a long-distance transmission system and a device applicable thereto, and more particularly to an LT-NT long-distance transmission system in which a two-wire metallic subscriber line is used to mutually connect a network terminal (NT) which accommodates terminal equipment (TE)and a line terminal (LT).

The basic services of the ISDN (Integrated Services Digital Network) in Japan are designed and developed so that a two-wire metallic subscriber line used in the conventional analog telephone transmission is applied without any modification and high-transmission-rate data transmission is realized using such a subscriber line. At the initial stage of the development, it was planned to accommodate 99% of the total number of subscribers through digital transmission lines. After that, however, it was found that some areas accommodated in the analog system could not be accommodated in the digital system for various reasons. For example, there was a limitation resulting from loss of the main signal caused during the propagation of the main signal through the subscriber line. Further, there was a restriction concerning a feed of electricity to the NT (including TE). In addition, there has recently been an unexpected increase in the number of subscribers located at a long distance from the office facility (LT). Under the above situations, it is required to efficiently provide subscribers located in areas as described above with services.

2. Description of the Related Art

FIGS. 1, 2 and 3 show prior art. More particularly, FIG. 1 shows a network structure which conforms with the TTC standard (JT-G961) defined by the Telecommunication Technology Committee in Japan and which is provided by NTT (Nippon Telegraph and Telephone Corporation). The network shown in FIG. 1 includes a central office 100, a switch 6, a line terminal (LT) 50 accommodating network equipment (NT), a metallic subscriber line 1, a user's house 200a, a network terminal (NT1) 30, ISDN standard terminal equipment (TE) 10, an existing analog telephone set (TEL) 5, a terminal adapter (TA) 4, an office building 200b, a network terminal (NT2) 60, a user's house 200c located a long distance away from the central office 100, a central office terminal (CT) 61, a remote terminal (RT) 62, and an optical fiber cable 2. The network terminal (NT1) 30 has the functions of terminating the subscriber line 1, establishing a phase synchronization (frame synchronization and bit synchronization), changing the data transmission rate, and testing and protecting the system from an excessive voltage. The network terminal 30 can also be called a digital service unit (DSU). The terminal adapter (TA) 4 is equipped with functions of converting the protocol and changing the data transmission rate in order to connect the telephone set 5 to the network terminal 30. The network terminal (NT2) 60 has a PBX (Private Branch Exchange) function including a line connection control, switching and selection and a protocol processing function in order to accommodate the terminal equipment 10 and implement switching therebetween.

The central office 100 and the user's house 200a are connected by a two-wire metallic subscriber line 1a as in the case of the conventional analog system. The possible transmission distance in the existing facility specification is 7 km without any repeater. The network terminal 30 and a plurality of terminal equipment 10 are connected by a four-wire metallic cable 3 (which is 100–200 m long) in a bus system. Symbols R, S, T and U denote reference points. The connection between the central office 100 and the user's home 200c located a long distance away will be described later.

FIG. 2 schematically shows the line terminal 50, the network terminal 30 and the terminal equipment 10 and connections therebetween.

The line terminal 50 is configured as follows. A signal processing part 51 establishes a phase synchronization of the main signal and changes the transmission rate. A signal transmission circuit 52 sends a signal to the subscriber line 1. A signal reception circuit 53 receives a signal from the subscriber line 1, and includes the function of equalizing the main signal. A symbol T2 denotes a main signal transformer, and C2 is a capacitor for DC isolation. The capacitor C2 is not limited to the position shown in FIG. 2. An office feed part 54 remote-feeds electricity to the network terminal 30. A normal/reverse switch 55 switches the polarity in feeding. A power separation filter PSF2 is formed of a coil or the like, and realizes AC isolation.

The network terminal 30 is configured as follows. A symbol T1 denotes a main signal transformer, and C1 denotes a capacitance for DC isolation. The capacitor C1 is not limited to the position shown in FIG. 2. A board 31 has a main signal circuit part. A signal processing part 32 has the functions of establishing the phase synchronization of the main signal and changing the data transmission rate. A signal transmission circuit 33 sends a signal to the subscriber line 1. A variable equalizer 36 amplifies a signal received from the subscriber line 1 and compensates for (or equalizes) a deterioration of the received signal due to the characteristics of the transmission line (the amplitude characteristic, the phase characteristic and so on) which depend on the distance thereof. A symbol R denotes a reception circuit to the bus line 3, and a symbol T denotes a transmission circuit from the bus line 3. A symbol PSF1 denotes a power separation filter for AC isolation. A standby circuit 44 feeds DC electricity to the terminal equipment 10 when a call issued by the terminal equipment 10 is detected or the normal feeding of electricity to the network terminal 30 is performed. A call detection part 45 detects a call from the terminal equipment 10. A DC power source (SRG) 46 is a series regulation generator. A symbol DN denotes a diode which is connected in normal-connection fashion and implements the normal feed to the DC power source 46. A DC/DC converter 47 supplies DC electricity to the board (main signal circuit part) 31 and the terminal equipment 10 at the time of the reverse feed to the NT 30. A symbol DR denotes a diode which is connected in the reverse connection fashion and implements the reverse feed to the DC/DC converter 47. A terminal feed circuit 48 carries out the remote feed from the network terminal 30 to the terminal equipment 10.

The terminal equipment 10 is configured as follows. A symbol T denotes a transmission circuit which sends a signal to the bus line 3, and a symbol R denotes a reception circuit which receives a signal from the bus line 3. A signal processing part 11 processes the main signal. A DC/DC converter 12 receives the remote feed of electricity from the network terminal 30 and supplies the DC electricity to the terminal equipment 10.

AMI (Alternate Mark Inversion) code is applied to data communications between the terminal equipment 10 and the network terminal 30 and between the network terminal 30 and the line terminal 50. The AMI code is characterized in that the required bandwidth can be reduced and the DC component can be suppressed. The main signal level between the terminal equipment 10 and the network terminal 30 is equal to ±0.75 V and the main signal level between the network terminal 30 and the line terminal 50 is equal to ±0.6 V.

The channel bit rate supported by the ISDN basic services is such that 2B+D=144 kbps, and is formatted to the frame signal of a bit rate of 48 bits per frame (including various control bits) between the terminal equipment 10 and the network terminal 30. Hence, it takes 250 μs to transmit one frame. Thus, the line bit rate between the terminal equipment 10 and the network terminal 30 is equal to 192 kbps, and is supported therebetween by two-way communications of the four-wire system.

The two-wire system is employed between the network terminal 30 and the line terminal 50. Thus, the channel bit rate of 144 kbps is supported by a time-division direction-control transmission system (Ping-Pong transmission system). Hence, the line bit rate between the network terminal 30 and the line terminal 50 is set equal to 320 kbps, which is more than twice the above-mentioned bit rate of 144 kbps, taking into account a transmission delay and a guard time defined between the consecutive frames. The time-division direction-control transmission system is also called a TCM (Time Compression Multiplexing) transmission system.

The network terminal 30 (and the terminal equipment 10) in the ISDN basic services is supplied with power necessary for communications from the central office side (line terminal 50). Hence, communications continue to take place in the event of an emergency such as breakdown of a commercial power supply.

A brief description will now be given of the remote feed control of the line terminal 50. The normal feed (L1=plus, L2=minus) from the line terminal 50 is carried out at the time of the standby of the network terminal 30 (when no communications take place). At that time, in the network terminal 30, the normal diode DN is turned on and the remote feed is applied to the series regulation source 46. Then, the series regulation source 46 outputs power as much as the remote feed to the standby circuit 44 and the terminal equipment 10 (over 40V and 420 mW).

When a call takes place from the terminal equipment 10 in the above-mentioned state, the call detection circuit 45 detects the above call, and notifies the line terminal 50 of the detection of a call by turning ON a loop circuit (not shown) or the like.

In the line terminal 50, the loop-ON is detected by the office feed part 54, which thus activates the normal/reverse switch 55. Hence, the feed is switched to the reverse feed (L1=minus, L2=plus) from the normal feed. At this time, the reverse diode DR of the network terminal 30 is turned ON and the DC/DC converter 47 is supplied with the remote feed. Then, the DC/DC converter 47 outputs power as much as the remote feed to the board (main signal processing circuit) 31 (5 V, 250 mW) and power as much as the remote feed to the terminal equipment 10 (over 40 V, 420 mW).

FIG. 3B shows a feed characteristic of the office feed part 54 of the line terminal 50.

Referring to FIG. 3B, the normal feed is defined so that a feed current $I_L$ is reduced in order to suppress power loss due to a line resistance $R_L$ of the metallic subscriber line 1 and a constant-voltage feed takes place. The constant voltage is equal to, for example, 60 V±5%. FIG. 3B shows that the minimum value of the output voltage Vo of the constant-voltage feed is 57 V. The input voltage Vi of the network terminal 30 is decreased as the distance (line resistance $R_L$) from the line terminal 50 increases, as there is a little power loss due to the line resistance $R_L$. However, the network terminal 30 is required to supply the terminal equipment 10 with power of 40 V (over 420 mW) even during the normal feed. Thus, a DC current as high as 11–15 mA is made to flow through the metallic subscriber line 1.

The reverse feed feeds electricity so that the network terminal 30 (and the terminal equipment 10) which is in communication is not affected by power loss due to the line resistance $R_L$ of the metallic subscriber line 1 and a constant-current feed is carried out. The constant current $I_L$ is equal to, for example, 35.1 mA. Hence, there is a maximum power loss due to the line resistance $R_L$. When the line resistance is equal to 812 ohms which corresponds to the maximum value in the conventional standards, a power loss caused is equal to 1000 mW (=(35.1 mA)$^2$×812 Ω).

The network terminal 30 is equipped with a constant-voltage receiving circuit (not shown) provided in the DC/DC converter 47 so that the input voltage Vi becomes constant (for example, 28.5 V) at the time of the reverse feed. Hence, the DC/DC converter 47 can always obtain an input power Pi of approximately 1000 mW (Pi=ViI$_L$=28.5 V×35.1 mA≈1000 mW). The input power Pi is separated into a conversion loss in the DC/DC converter 47 (which is approximately equal to 300 mW with a transformation efficiency of 70%), the self-operation source of the network terminal 30 (about +5 V, 250 mW), and a power fed to the lower terminals (such as terminal equipment 10) which conforms with the TTC standardized regulations (over 40 V, 420 mW).

At the initial stage of the development of the ISDN basic services, it was planned to accommodate 99% of the total number of subscribers through digital lines. After that, it was found that some areas accommodated in the analog system could not be accommodated in the digital system for various reasons. For example, there was a limitation resulting from loss of the main signal caused when the main signal was transmitted over the line. Further, there was a restriction concerning a feed of electricity to the NT (including TE). The above will be described in detail below.

FIG. 3A shows an AC loss characteristic of the metallic subscriber line 1. Generally, the loss of the metallic line 1 increases based on $f^{1/2}$ where f denotes frequency ($\sqrt{f}$ characteristic). Further, the AC loss resulting from the distributed constant increases as the distance becomes longer. The AC loss is generally evaluated by loss in the given band of the main signal in which the signal power is concentrated.

Conventionally, the upper limit of the AC loss in the given band (around 160 kHz) is set up to 50 dB. Thus, the network terminal 30 (line terminal 50) cannot maintain a satisfactory signal quality in a long-distance accommodation in which the line loss exceeds the limitation of the main signal (50 dB). Hence, communications are no longer possible.

A description will be given, with reference to FIG. 3B, of the restriction due to the limitation on the remote feed.

The limitation on the remote feed depends on the reverse feed which causes a large line loss. At the time of the reverse feed, when it is assumed that the feed current It is equal to 35.1 mA and the voltage Vi necessary at the input of the network terminal 30 is equal to 28.5 V, the tolerable line resistance $R_L$ of the line 1 is obtained as follows by a back calculation from the maximum lower limit (57 V) of the feed output voltage Vo of the line terminal 50:

$$R_L = (V_o - V_i)/I_t$$
$$= (57 - 28.5)/35.1 \times 10^{-3} \approx 812 \, \Omega.$$

Hence, the network terminal 30 cannot receive expected power from the line terminal 50 and cannot supply the terminal equipment 10 with the regulated power in a long-distance accommodation over the limit value of the line resistance $R_L$. In such cases, communications no longer take place.

As described above, the conventional art does not provide some areas with digital communication services due to the limitation on the main signal caused by the line loss and the restriction caused by the limitation of the power feed to the network terminal 30 (which includes the terminal equipment 10).

It may be possible to increase the feed voltage of the line terminal 50 in order to improve the limit value of the line resistance. However, such a measurement requires new facilities to be installed in the line terminal 50 and an increased cost of development and installation.

Turning to FIG. 1 again, the prior art employs the central office terminal (CT) 61 and a remote terminal (RT) 62, which terminals are provided between the central office 100 and the remote users 200c in order to enable the long-distance accommodation. The terminals 61 and 62 are coupled with each other through an optical subscriber line 2 (having a bit rate of, for example, 1.5/6.3 Mbps).

However, remote base stations such as the terminals 61 and 62 have an extremely high cost. In a case where a large number of subscribers offsetting the extremely high cost is not expected, the remote base stations are not liable to be installed in practice. Thus, in actuality, the digital communication services cannot be presented to all areas studded with subscribers from technical and economical viewpoints.

SUMMARY OF THE INVENTION

It is a general object of the present invention to eliminate the disadvantages of the prior art.

A more specific object of the present invention is to provide a long-distance transmission system and device capable of efficiently realizing long-distance digital transmission between the line terminal and the network terminal without any modification of main parts of the existing line terminal and the network terminal.

The above objects of the present invention are achieved by a long-distance transmission system comprising: a network terminal that accommodates terminal equipment; and a line terminal connected to the network terminal via a two-wire metallic subscriber line, the network terminal comprising an amplifier, which amplifies a transmission level of a transmission signal to be transmitted to the line terminal via the two-wire metallic subscriber line on the basis of a characteristic of the two-wire transmission line. Hence, the AC loss limit value can be improved without adding any substantial modification to the existing line terminal and long-distance communications can take place with high reliability.

The long-distance transmission system may be configured so that the amplifier amplifies the transmission level of the transmission signal so that the transmission signal is applied to the two-wire metallic subscriber line at a level exceeding an AC loss limit of the two-wire metallic subscriber line. Hence, the metallic subscriber line between the network terminal and the line terminal can be extended.

The long-distance transmission system may be configured so that the network terminal comprises a circuit which adjusts a waveform of the transmission signal so that an adjusted waveform thereof is suitable for the characteristic of the two-wire metallic subscriber line. The transmission signal deteriorates during the propagation through the metallic subscriber line, and the waveform thereof is deformed. The deterioration of the transmission signal depends on the frequency characteristic of the metallic line, which depends on, for example, the diameter of the metallic subscriber line. By adjusting the waveform of the transmission signal, it becomes possible to improve the equalizing performance and suppress distortion of the waveform of the transmission signal.

The long-distance transmission system may be configured so that the network terminal comprises a circuit which adjusts the transmission level of the transmission signal. The adjustment of the transmission level makes it possible to improve the equalizing performance and suppress distortion of the waveform of the transmission signal. This will be enhanced when both the transmission level and the waveform are adjusted.

The long-distance transmission system may be configured so that the network terminal comprises another amplifier which amplifies a reception level of a signal which is received from the line terminal via the two-wire metallic subscriber line. The use of the above-mentioned another amplifier contributes to improving the AC loss limit value.

The long-distance transmission system may be configured so that the network terminal and the terminal equipment are fed with electricity from a local source applied to the network terminal and thus a remote feed power supplied via the two-wire metallic subscriber line from the line terminal is terminated by a resistor having a reduced resistance value. Even if the network equipment is not fed with sufficient electricity from the line terminal via the metallic subscriber line due to an extension thereof (increase in loss of the line), the network equipment and the terminal equipment can be fed with sufficient power from the local source. Further, power which was originally to be supplied from the line terminal but is no longer needed due to the local source can be assigned to the loss of the metallic subscriber line. Hence, the metallic subscriber line can be extended definitely. In addition, the termination with a reduced resistance value contributes to stable operations of various functions of the network terminal such as transmission of the main signal, opening/closing a loop and changing the polarity of the line.

The long-distance transmission system may be configured so that the network terminal is fed with electricity from the (first) line terminal via the two-wire metallic subscriber line and the terminal equipment is fed with electricity from another line terminal via another (second) two-wire metallic subscriber line. The first line terminal is sufficient to cover electricity to be fed to the network terminal only, and the second line terminal is sufficient to cover electricity to be fed to the terminal equipment only. Conventionally, one line terminal is required to cover electricity to be fed to both the network terminal and the terminal equipment. Hence, each of the first and second line terminals has a reduced burden of supply of electricity. This means that power which becomes unnecessary to feed the network terminal and the terminal equipment is assigned to the loss of the metallic subscriber lines, which are allowed to have increased distances. In the above structure, the first and second line terminals are not required to be substantially modified.

The long-distance transmission system may be configured so that the circuit adjusts the waveform of the transmission signal so that a pulse width of the transmission signal is changed. The characteristic of the two-wire metallic subscriber line dependent on, for example, the diameter of the line, deforms the waveform of the transmission signal. This deformation can be corrected by adjusting the pulse width of the transmission signal.

The long-distance transmission system may be configured so that the network terminal and the terminal equipment are fed with electricity from the line terminal via the two-wire metallic subscriber line in either a normal feed or a reverse feed depending on whether the network terminal is in a working state or a standby state and is always fed, in the normal feed, with electricity from the other line terminal via another two-wire metallic subscriber line. The above another line terminal is sufficient to cover electricity to be supplied to only the terminal equipment, and is thus equipped with the normal feed.

The above-described objects of the present invention are also achieved by a network terminal connectable to a two-wire metallic subscriber line, comprising: a transmission circuit that outputs a transmission signal; and an amplifier part which amplifies a transmission level of the transmission signal which is to be sent to the two-wire metallic subscriber line. Hence, the AC loss limit value can be improved without adding any substantial modification to the existing line terminal and long-distance communications can take place with high reliability.

The network terminal may be configured so that the amplifier part amplifies the transmission level of the transmission signal so that the transmission signal is applied to the two-wire metallic subscriber line at a level exceeding an AC loss limit of the two-wire metallic subscriber line. Hence, the metallic subscriber line between the network terminal and the line terminal can be extended.

The network terminal may be configured so that it further comprises a circuit which adjusts a waveform of the transmission signal so that an adjusted waveform thereof is suitable for a characteristic of the two-wire metallic subscriber line. The transmission signal deteriorates during propagation through the metallic line, and the waveform thereof is deformed. The deterioration of the transmission signal depends on the frequency characteristic of the metallic line, which depends on, for example, the diameter of the metallic line. By adjusting the waveform of the transmission line, it becomes possible to improve the equalizing performance and suppress deterioration of the waveform of the transmission signal.

The network terminal may further comprise a circuit which adjusts the transmission level of the transmission signal. The adjustment of the transmission level makes it possible to improve the equalizing performance and suppress deterioration of the waveform of the transmission signal. This will be enhanced when both the transmission level and the waveform are adjusted.

The network terminal may further comprise a circuit which adjusts the transmission level of the transmission signal so that both the transmission level and the waveform can be adjusted. It is possible to prevent the transmission signal from deteriorating even when it is propagated through the metallic subscriber line having an extended distance.

The network terminal may further comprise a receive amplifier which amplifies a reception level of a signal which is received from a line terminal via the two-wire metallic subscriber line. The use of the above-mentioned receive amplifier contributes to improving the AC loss limit value.

The network terminal may further comprise a local feed part which feeds the network terminal and terminal equipment connected thereto with electricity from a local source applied to the network terminal, so that a remote feed power supplied via the two-wire metallic subscriber line from the line terminal is terminated by a resistor having a reduced resistance value. Even if the network equipment is not fed with sufficient electricity from the line terminal via the metallic subscriber line due to an extension thereof (increase in loss of the line), the network equipment and the terminal equipment can be fed with sufficient power from the local source. Further, power which was originally to be supplied from the line terminal but is no longer needed due to the local source can be assigned to the loss of the metallic subscriber line. Hence, the metallic subscriber line can be extended definitely. In addition, the termination with a reduced resistance value contributes to stable operations of various functions of the network terminal such as transmission of the main signal opening/closing a loop and changing the polarity of the line.

The network terminal may further comprise: a first feed part which receives electricity for the network terminal from a first line terminal via the two-wire metallic subscriber line; and a second feed part which receives electricity for terminal equipment connected to the network terminal from a second line terminal via a second two-wire metallic subscriber line. The first line terminal is sufficient to cover electricity to be fed to the network terminal only, and the second line terminal is sufficient to cover electricity to be fed to the terminal equipment only. Conventionally, one line terminal is required to cover electricity to be fed to both the network terminal and the terminal equipment. Hence, each of the first and second line terminals has a reduced burden of supply of electricity. This means that power which becomes unnecessary to feed the network terminal and the terminal equipment is assigned to the loss of the metallic subscriber lines, which are allowed to have increased distances. In the above structure, the first and second line terminals are not required to be substantially modified.

The network terminal may be configured so that the circuit adjusts the waveform of the transmission signal so that a pulse width of the transmission signal is changed. The characteristic of the two-wire metallic subscriber line dependent on, for example, the diameter of the line, deforms the waveform of the transmission signal. This deformation can be corrected by adjusting the pulse width of the transmission signal.

The network terminal may be configured so that: the amplifier part is a part of a transformer via which the network terminal is connected to the two-wire metallic subscriber line; and the part of the transformer has a winding ratio with which the transmission level of the transmission signal can be boosted. Hence, the transmission level can be increased by a simple structure. The amplifier part is not limited to the above but may be formed by a current amplifier or a voltage amplifier. Further, the amplifier part may be configured by adjusting given resistors used in the existing network terminal and connected to the power supply system.

The network terminal may be configured so that it further comprises: a first circuit which generates a plurality of waveforms of the transmission signal; and a second circuit which selects one of the plurality of waveforms suitable for a characteristic of the two-wire metallic subscriber line. The individual two-wire metallic subscriber lines have respective frequency v. AC loss characteristics. The above configuration makes it possible to select one of the waveforms of the transmission signal most suitable for the existing metallic subscriber line, so that the transmission signal can be propagated through the metallic subscriber line having an extended distance with a reduced deterioration.

The network terminal may further comprise a third circuit which adjusts the transmission level of the transmission signal so that an adjusted transmission level is suitable for the two-wire metallic subscriber line. Hence, the transmission signal can be propagated through the metallic subscriber line having an extended distance with a further reduced deterioration.

The network terminal may further comprise: a first circuit which generates a plurality of waveforms of the transmission signal; a second circuit which selects, in response to a control signal, one of the plurality of waveforms suitable for a characteristic of the two-wire metallic subscriber line; a third circuit which adjusts the transmission level in response to the control signal; and a fourth circuit which supplies the control signal to the second and third circuits. With a simple structure, it becomes possible to select the waveform of the transmission signal optimal to the metallic subscriber line and to thus prevent the waveform from deteriorating during propagation therethrough.

The network terminal may be configured so that: the fourth circuit includes a memory which stores items of data related to combinations of the waveforms and adjustable transmission levels; and one of the items of data suitable for the two-wire metallic subscriber line is read from the memory and applied to the second and third circuits as the control signal. With a simple structure, it becomes possible to select the waveform and transmission level of the transmission signal optimal to the metallic subscriber line and to thus prevent the waveform from deteriorating during propagation therethrough.

The network terminal may be configured so that: the items of data are sequentially selected one by one and are applied to the second and third circuits; and one of the items of data used when a receive system of the network terminal is pulled in synchronization based on data received via the two-wire metallic subscriber line is selected as the control signal. Even if the characteristic of the metallic subscriber line is unknown, it is possible to determine the waveform and transmission level of the transmission signal suitable for the metallic line.

The network terminal may be configured so that the above-mentioned one of the items of data selected as the control data is stored in the memory. Hence, communications can take place by using the control data stored in the memory so that highly reliable communications can be obtained.

The network terminal may further comprise a series regulator source which transforms the electricity from the second two-wire metallic subscriber line to power to be supplied, as a normal feed, to terminal equipment connected to the network terminal. The normal feed is a constant-voltage feed having comparatively small line loss, and the voltage drop at a power receiving terminal of the network terminal is small. Hence, a series regulator source which needs an input voltage greater than the output voltage (for example, 40 V) can be used. Generally, the series regulator source is a comparatively simple and less-expensive power source.

The network terminal may be configured so that it further comprises a DC/DC converter which converts the electricity from the second two-wire metallic subscriber line to power to be supplied, as a normal feed, to terminal equipment connected to the network terminal. Generally, the DC/DC converter is capable of deriving a desired output voltage (for example, 40 V) from any input voltage as long as a given power condition is satisfied. Hence, the use of the DC/DC converter enables both the normal feed and the reverse feed (constant-current power feed).

The network terminal may be configured so that the receive amplifier comprises an amplifier having a flat gain characteristic. Generally, the AC loss of the metallic subscriber line increases nonlinearly as the length thereof increases. However, there are some cases where the AC loss of the metallic subscriber line substantially increases linearly as the distance increases. In these cases, an amplifier having a flat gain characteristic within a given frequency band at which power is concentrated can be used.

The receive gain of the main signal can also be accomplished by increasing the gain of the existing variable equalizer. However, it is not easy to modify the existing variable equalizer for the following reasons. First, the existing equalizer is adjusted so as to compensate for (equalize) a line loss up to 50 dB at maximum. Second, the existing equalizer is a part of an LSI device and is packaged with other circuits. In this regard, the above structure newly employs the receive amplifier.

Theoretically, the reception-side winding ratio of the transformer via which the metallic subscriber line is connected can be changed to increase the receive gain. In this case, if the transmission-side winding ratio of the above transformer is also adjusted so as to obtain an increased transmission gain, an excessive signal component is transferred from the transmission side of the transformer to the reception side. In this case, the LSI devices provided in the reception system of the network terminal may be damaged. For the above reason, the receive amplifier is preferably provided separated from the transformer while the transmit amplifier can be part of the transformer (adjustment of the transmission-side winding ratio).

The network terminal may be configured so that the receive amplifier comprises an amplifier having a slant gain characteristic. If the AC loss characteristic of the metallic subscriber line is changed in a complex fashion due to an extension thereof, it is preferable to use an amplifier having a slat gain characteristic, namely, an amplifier having an equalizing function which satisfies the Nyquist distortionless characteristic. Hence, it is possible to appropriately improve the limitation on the main signal due to the line loss.

The network terminal may further comprise a reset circuit which resets a given part of the network terminal in a standby mode by detecting a polarity of the two-wire metallic subscriber line in feeding electricity. If the given part of the network terminal (such as a main signal circuit) is in the standby mode (at the time of the normal feed) and is continuously supplied with electricity, the operation sequence of the given part may be affected. In contrast, the reset circuit resets the given part that is in the standby mode. Hence, the above problem does not occur.

BRIEF DESCRIPTION OF THE DRAWINGS

Other objects, features and advantages of the present invention will become more apparent from the following detailed description when read in conjunction with the accompanying drawings, in which:

FIGS. 21A, 21B and 21C are waveform diagrams of waveforms which satisfy a condition that the transmission power is constant.

DESCRIPTION OF THE PREFERRED EMBODIMENTS

Figure 1:
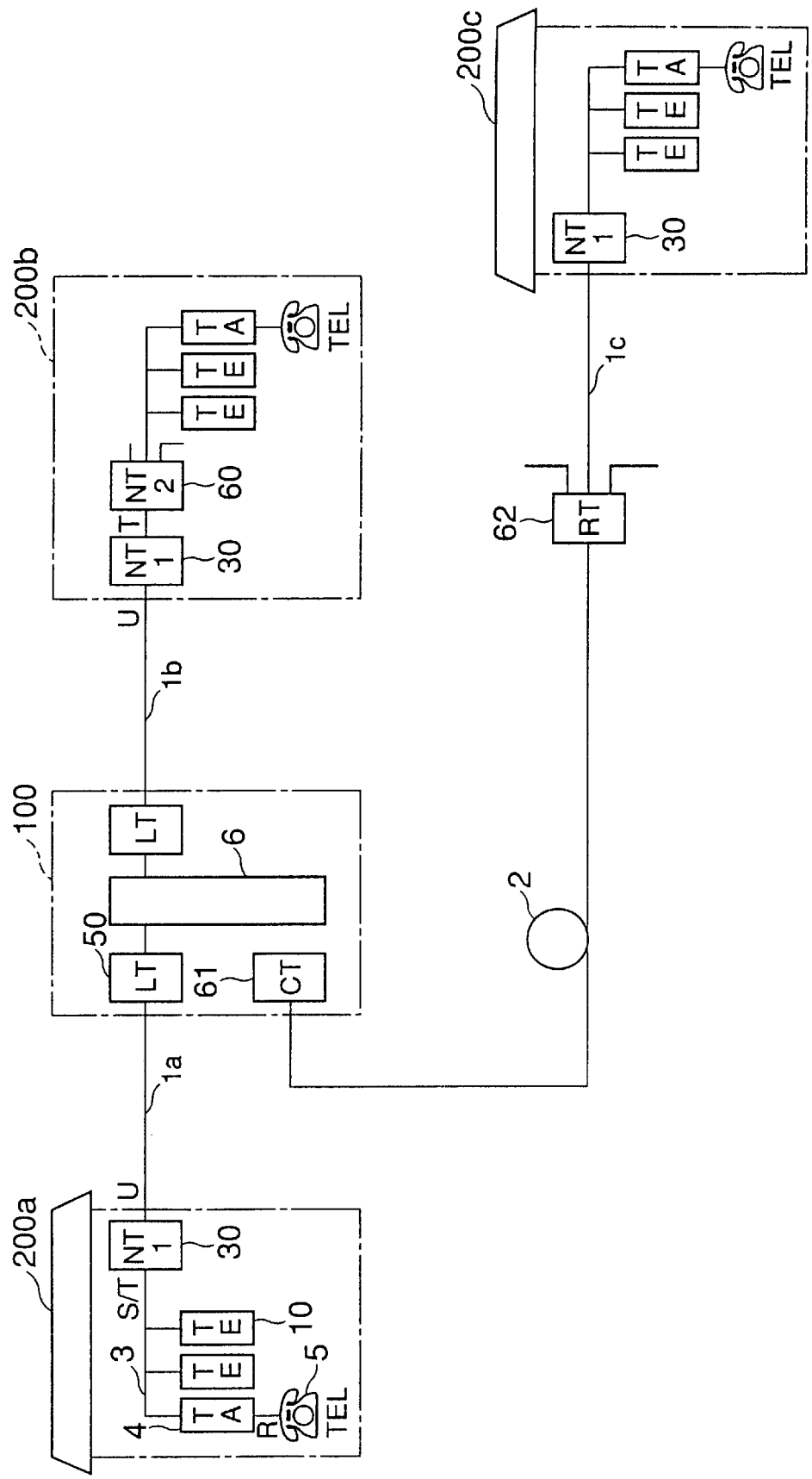
FIG. 1 is a block diagram of a conventional long-distance communication system.
Figure 2:
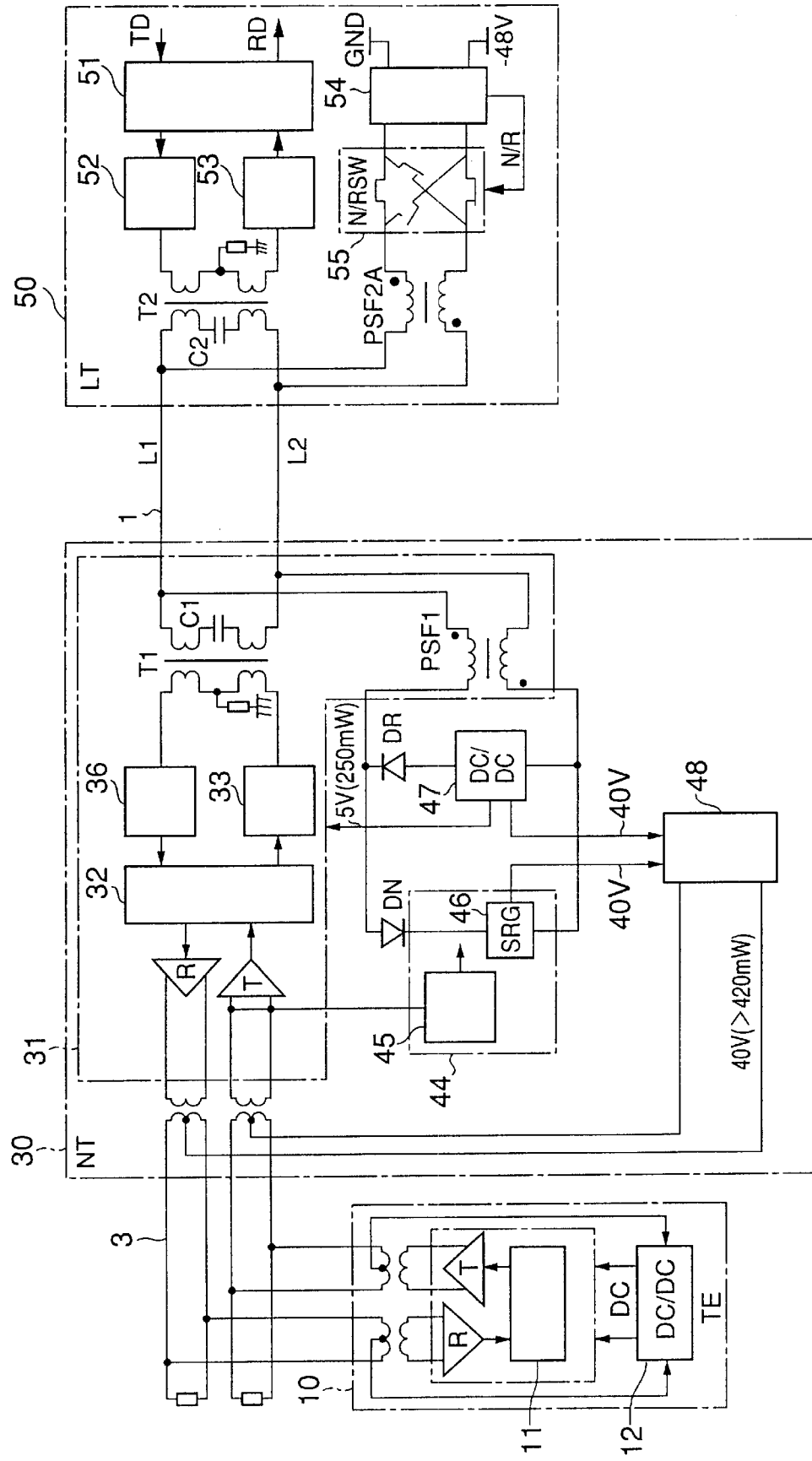
FIG. 2 is a block diagram of a network terminal and a line terminal shown in FIG. 1.
Figure 3A:
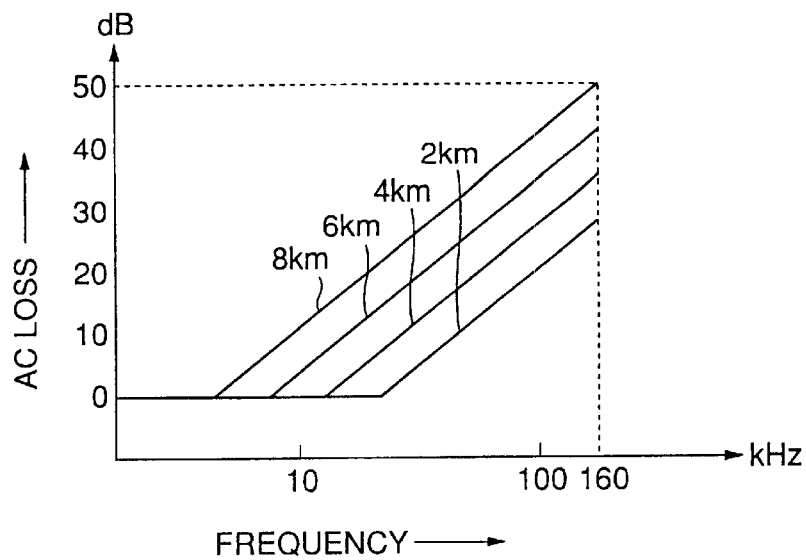
FIGS. 3A and 3B are graphs for explaining disadvantages of the conventional system.
Figure 3B:
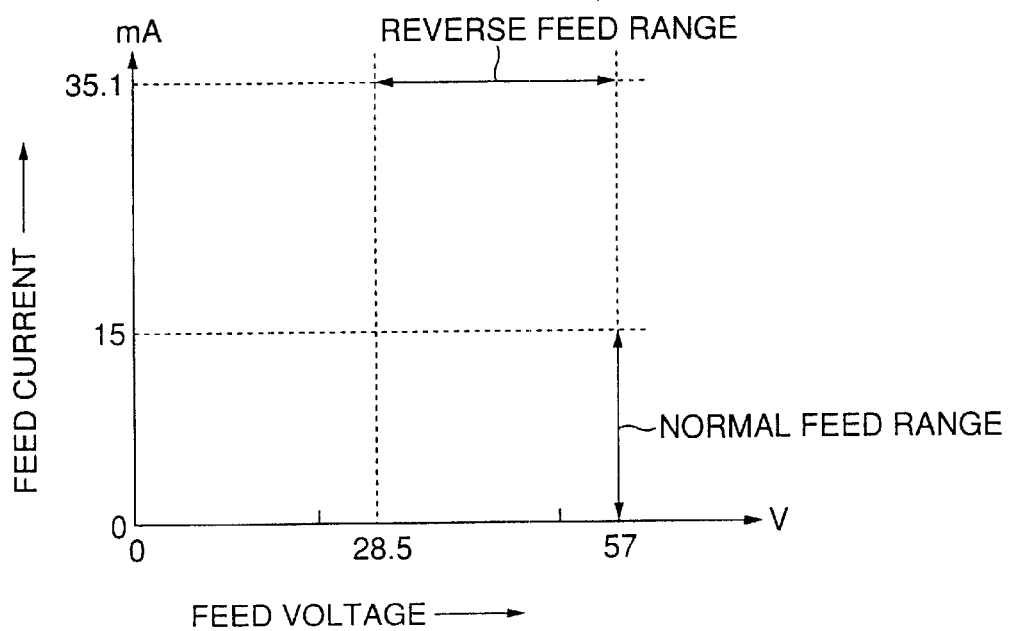
Figure 4:
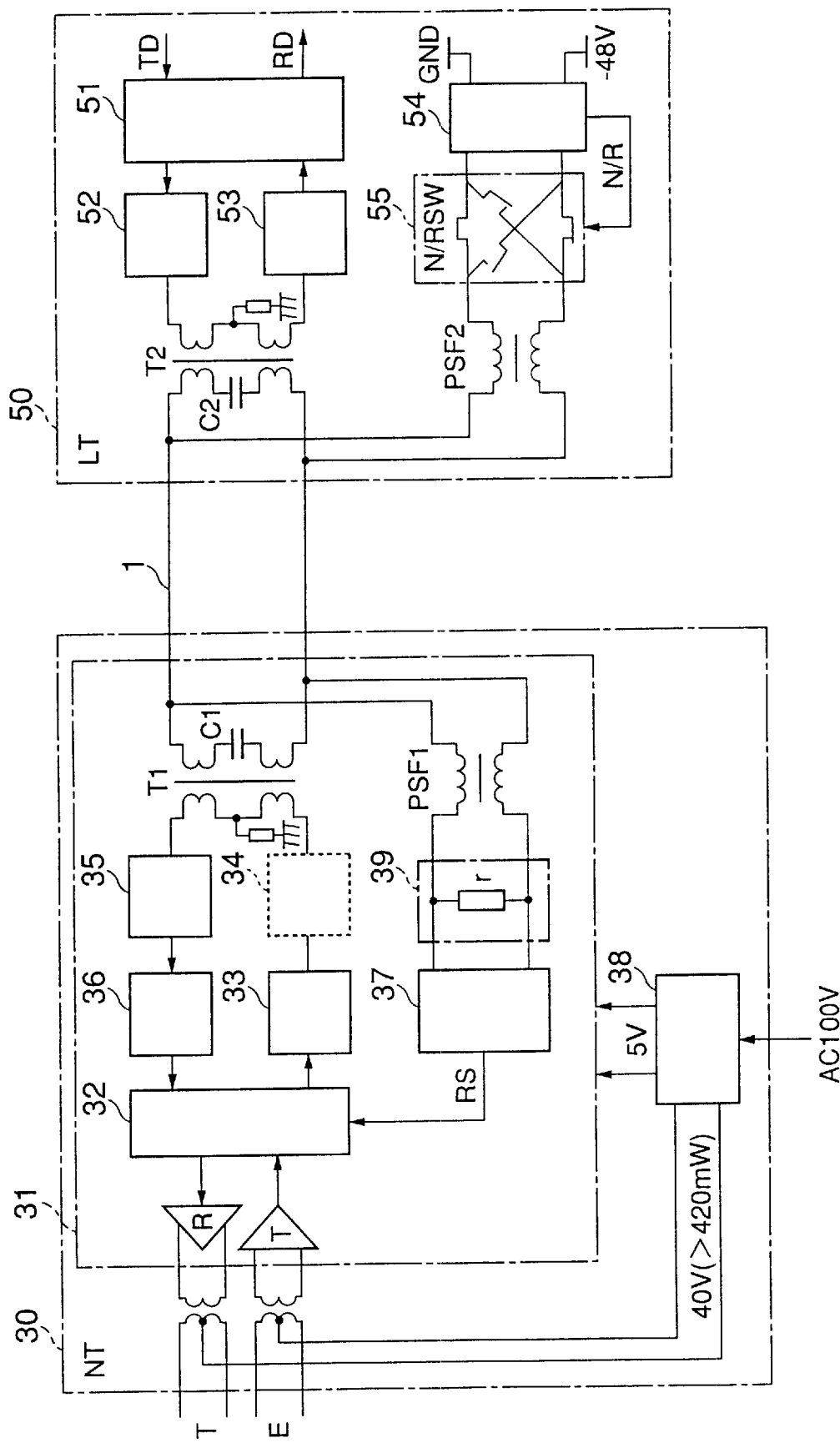
FIG. 4 is a block diagram of an outline of a long-distance transmission system and device of the present invention.

FIG. 4 is a block diagram of an outline of a long-distance transmission system and device of the present invention. In FIG. 4, parts that are the same as those shown in FIG. 2 are given the same reference numbers.

The system shown in FIG. 4 differs from that shown in FIG. 2 as follows. First, a transmit amplifier 34 is provided. Second, a receive amplifier 35 is optionally provided. Third, a reset circuit 37 is provided. Fourth, a feed termination unit 39 is provided. The circuits 37 and 39 are substituted for the standby circuit 44, the DC/DC converter 47 and the diode DR shown in FIG. 2. Fifth, a local feed unit 38 is provided instead of the terminal feed circuit 48 shown in FIG. 2. The system shown in FIG. 4 is configured so that all of the amplifiers 34 and 35, the reset circuit 37 and the feed termination unit 39 are provided in the network terminal 30 and form the main signal circuit 31 formed on the board.

Figure 5:
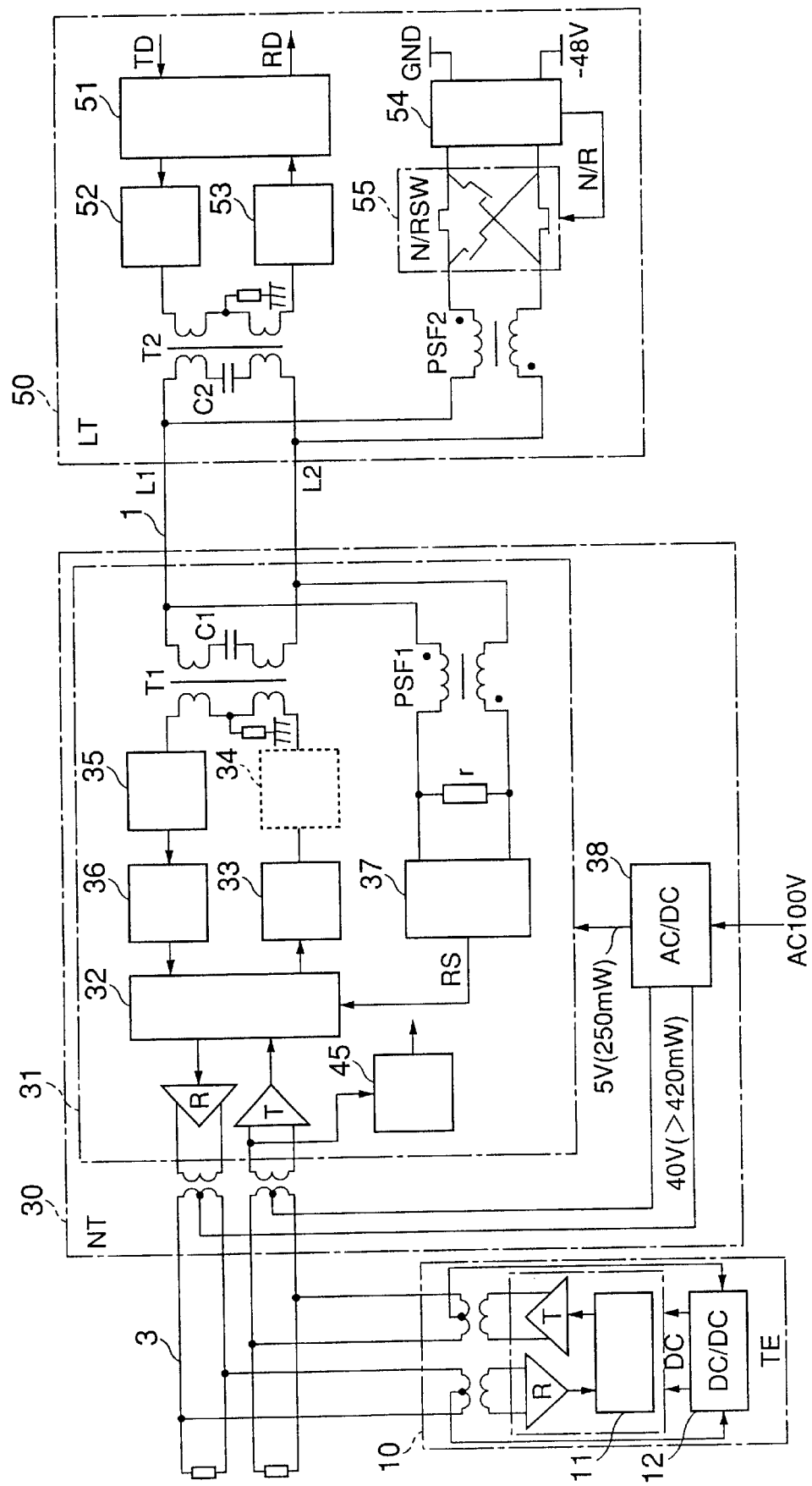
FIG. 5 is a block diagram of a long-distance transmission system according to a first embodiment of the present invention.

More particularly, referring to FIG. 5 illustrating a first embodiment of the present invention, the transmit amplifier 34 functions as a level amplifier which amplifies the transmission level of the main signal. The receive amplifier 35 functions as a preamplifier which amplifies the reception level of the main signal. The feed termination unit 39 includes a resistance element which terminates the remote feed power from the line terminal 50 with a comparatively small resistance value. The reset circuit 37 resets the main signal circuit 31 at the time of the standby (normal feed) of the network terminal 30 by detecting the polarity of the metallic subscriber line 1. The local feed circuit 38 is formed of an AC/DC converter which supplies a local feed derived from the commercial source input (for example, AC 100 V) to the network terminal 30 and the terminal equipment 10. The parts shown in FIG. 4 other than those described above are the same as those shown in FIG. 2.

The transmission level of the network terminal 30 is increased by α dB in order to improve, by α dB, the AC loss limitation between the line terminal 50 and the network terminal 30 without any modification of the line terminal 50. Optionally, the reception gain of the network terminal 50 is increased by α dB.

The level amplifier 34 of the main signal circuit 31 is implemented by an increased transmission winding ratio of the transformer T1 so that the transmission level can be increased by α dB. More particularly, a second winding voltage e2 can be expressed as follows:

$$e2=(n2/n1)\times e1$$

where e1 denotes the voltage developing across the primary winding of the transformer T1, n1 denotes the number of turns of the primary winding, e2 denotes the voltage developing across the secondary winding thereof, and n2 denotes. the number of turns of the secondary winding. Hence, it is possible to boost the transmission voltage applied to the metallic subscriber line 1 by increasing the transmission-side winding ratio n2/n1 by α dB.

It is considerable to form the preamplifier 35 of a first configuration having a flat gain characteristic within a required band of the main signal (at which band the signal power is concentrated) or a second configuration having a slant gain characteristic within the required band of the main signal.

Figure 6A:
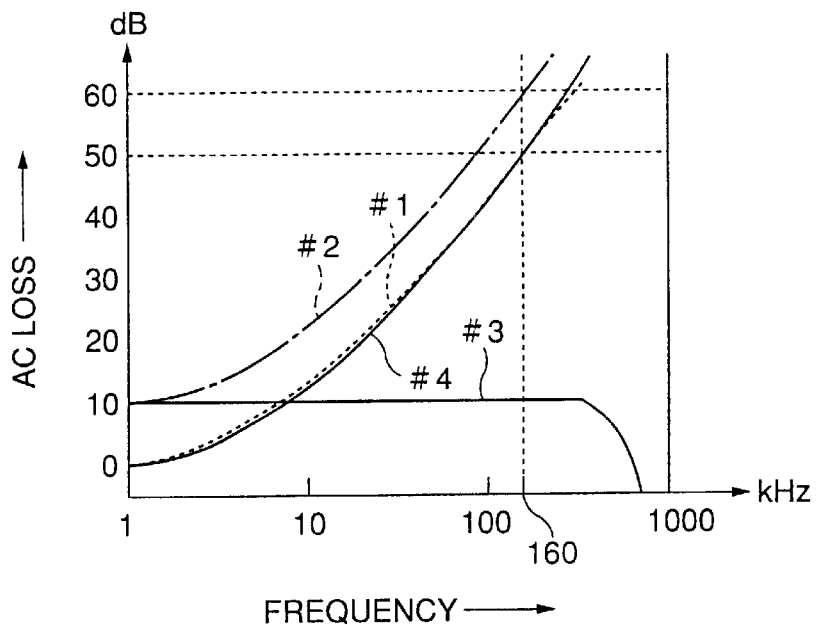
FIGS. 6A and 6B are graphs of amplifier characteristics of a receive circuit shown in FIG. 5.
Figure 6B:
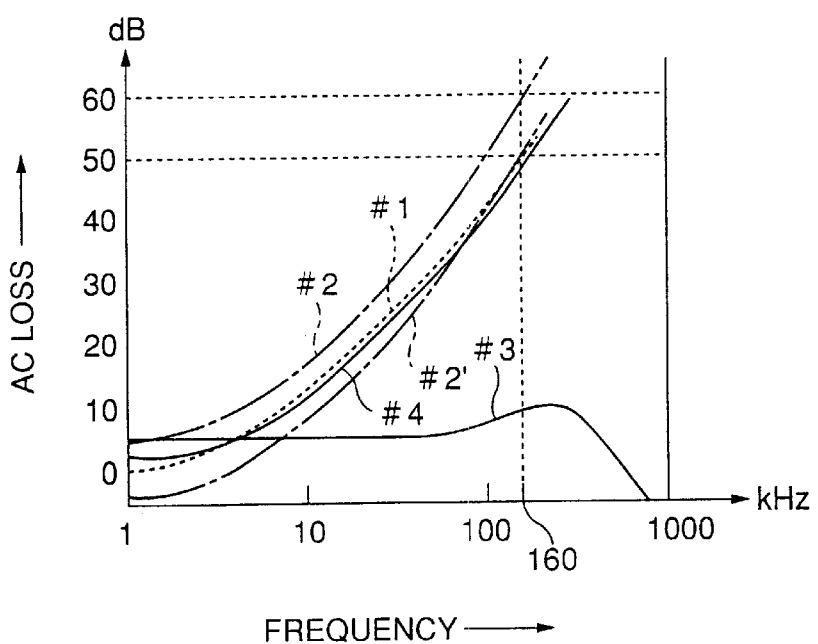

FIGS. 6A and 6B are graphs of receive amplification characteristics. More particularly, FIG. 6A shows a line loss compensation characteristic obtained when the preamplifier 35 having the flat gain characteristic is inserted in front of the variable equalizer 36. In the graph of FIG. 6A, curve #1 indicates an AC loss characteristic of an example of the existing metallic communication line 1. The preamplifier 35 is provided so that it is located at the maximum distance (about 7 km) from the line terminal 50 and the maximum loss in the required band (around 160 kHz) at which the signal power is concentrated is equal to 50 dB.

Curve #2 is obtained when the existing metallic line 1 is extended by, for example, 2 km until the AC loss in the same required band as described above with regard to curve #1 is increased by +10 dB (that is, increased to 60 dB) or when the 7 km metallic line 1 is replaced by a metallic line which is about 9 km long and is of a type identical to or different from the type of the metallic line 1. Curve #4 can be obtained by downward parallel movement of curve #2. The characteristic described by curve #4 is almost the same as that described by curve #1. Particularly, the slant loss responses of curves #1 and #4 around 160 kHz at which frequency the signal power is concentrated, are almost the same as each other.

In cases as described above, the preamplifier 35 having the flat gain characteristic such as curve #3 is provided in a stage preceding the variable equalizer 36. Hence, there is obtained, at the input of the variable equalizer 36, the loss characteristic #4 which matches the conventional loss characteristic #1 well. Hence, it is possible to obtain, without any particular modification of the variable equalizer 36, a receive equalization that satisfies the Nyquist distortionless condition with regard to the total characteristic of the transmission line between the line terminal 50 and the network terminal 30.

FIG. 6B shows a line loss compensation characteristic obtained when the preamplifier 35 having a slant gain characteristic is inserted in front of the variable equalizer 36. In the graph of FIG. 6, curve #1 indicates an AC loss characteristic of an example of the existing metallic communication line 1. The preamplifier 35 is provided so that it is located at the maximum distance (about 7 km) from the line terminal 50 and the maximum loss in the required band (around 160 kHz) at which the signal power is concentrated is equal to 50 dB.

Curve #2' can be obtained by downward parallel movement of curve #2 amounting to 10 dB. The characteristic described by curve #2' does not coincide with curve #1. Particularly, the slant loss responses of curves #1 and #2' obtained around 160 kHz, at which frequency the signal power is concentrated are different from each other.

In cases as described above, loss characteristic #4 can be obtained at the input of the variable equalizer 36 by providing the preamplifier 35 having slant gain characteristic #3 in the required band at a stage preceding the variable equalizer 36. Characteristic #4 does not totally coincide with characteristic #1 over the required band but coincides therewith well in the band around 160 kHz. Hence, it is possible to obtain a receive equalization that satisfies the Nyquist distortionless condition over the transmission line between the line terminal 50 and the network terminal 30.

Figure 7A:
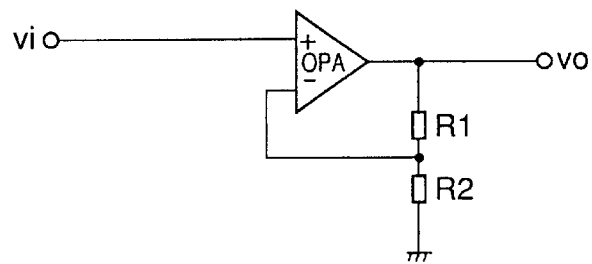
FIGS. 7A and 7B are circuit diagrams of configurations of the receive amplifier shown in FIG. 5.
Figure 7B:
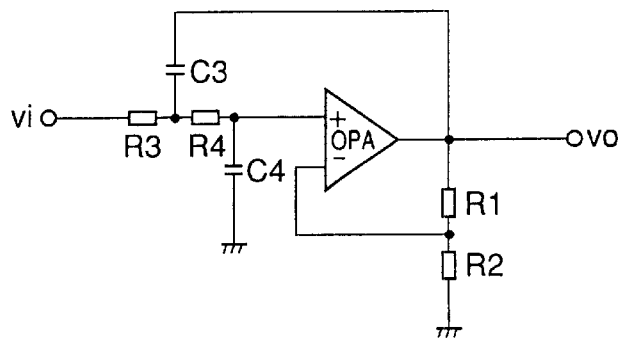

FIGS. 7A and 7B are circuit diagrams of configurations of the receive amplifier 35.

FIG. 7A shows a configuration of the receive amplifier 35 which has the flat gain characteristic. The receive amplifier 35 includes a non-inverting amplifier using an operational amplifier OPA. The input signal Vi is applied to the non-inverting input terminal of the operational amplifier OPA. A feedback signal having a given ratio with respect to the output signal Vo is fed back to the inverting input terminal of the operational amplifier OPA. The gain A of the flat-gain amplifier can be expressed as follows:

$$A = Vo/Vi = \mu/(1+\mu\beta) \approx 1/\beta$$
$$= (R1+R2)/R2$$

where $\mu$ denotes the open gain of the operational amplifier OPA. Further, it is assumed that the ratio of the feedback voltage Vf to the output voltage Vo, Vf/Vo, is equal to $\beta\{=R2/(R1+R2)\}$. The resistors R1 and R2 form a feedback signal generating circuit of the operational amplifier OPA. The feedback signal generating circuit made up of the resistors R1 and R2 does not have any frequency response, and an approximately flat amplifier characteristic up to the cutoff range can be obtained.

FIG. 7B shows a configuration of the slant-gain amplifier circuit 35. The configuration shown in FIG. 7B is a secondary low-pass filter using an operational amplifier OPA. A feedback circuit of the operational amplifier OPA includes, in addition to the resistors R1 and R2, a secondary passive low-pass filter made up of resistors R3 and R4 and capacitors C3 and C4. Thus, as shown in FIG. 6B, a peaking characteristic can be obtained around 160 kHz, at which frequency the signal power is concentrated, and can compensate for the slant of the line loss caused around 160 kHz.

The circuit configurations shown in FIGS. 7A and 7B are merely examples, and the receive amplifier 35 having different configurations can be employed.

Turning to FIG. 5 again, a description will be given of an improvement in the limited value of the line resistance according to the first embodiment of the present invention. As has been described previously, the maximum line resistance permitted to the conventional metallic subscriber line 1 is equal to 812 Ω. The above limited value is determined taking into account the minimum power (35.1 mA×28.5 V≈1000 mW) at the time of the remote feed necessary for the network terminal 30 (and terminal equipment 10) at the time of communicating (at the time of the reverse feed) to operate.

The first embodiment of the present invention is equipped with the AC/DC converter 38 to which electricity such as a commercial input (for example, AC 100 V) is locally supplied. The AC/DC converter 38 derives, from the AC electricity, DC power of 5V (250 mW) for operating the network terminal 30 and DC power of 40 V (420 mW or higher) for operating the terminal equipment 10. Hence, the metallic subscriber line 1 is no longer required to carry the remote feed to the network terminal 30 (the terminal equipment 10), but is required to have only the functions of implementing superimposing of an AC signal onto the metallic line 1 and notifying of information indicating whether the loop between the line terminal LT and the network terminal NT is open or closed and indicating the feed polarity.

Hence, it is possible to transform power Pi needed by the conventional network terminal to loss due to a line resistance RL'. Hence, the metallic subscriber line 1 can be extended by a distance equal to the power needed by the conventional network terminal.

In the above case, the transformed amount Pi (=1000 mW) can be transformed, as the new line resistance RL', to a resistance of 812 ohms at maximum as follows:

$$R'_L = Pi/I_L^2 = 1000 \text{ mW}/(35.1 \text{ mA})^2$$
$$= 812 \text{ }\Omega.$$

The above means that the metallic subscriber line 1 can be extended up to, at maximum, twice the maximum distance thereof in DC fashion. However, in practice, it is required to take into consideration the AC loss limited value and the actual distance to the users' homes. Hence, the metallic line can be extended or a new metallic line be laid within the range in which the sum of the resistance values RL and RL' is less than 1624 Ω ((RL+RL')<1624 Ω).

Preferably, the feed power to the extended or newly provided metallic subscriber line 1 is terminated by means of the resistor r (having a resistance of approximately 100 Ω. In this case, the power consumed in the network terminal 30 can be reduced to approximately one tenth of the power (that is, (35.1 mA)²×100 Ω)=123 mW) conventionally consumed therein. The above improvements make it possible to stably implement the functions of superimposing an AC signal onto the metallic line 1 and notifying of information indicating whether the loop between the line terminal LT and the network terminal NT is open or closed and indicating the feed polarity.

In the case where the local feed is applied to the network terminal 30 as described above, the main signal circuit 31 of the network terminal 30 operates at the time of not only the reverse feed (communicating) but also the normal feed (not communicating). This may cause a problem in the operation sequence of the network terminal 30. The first embodiment of the present invention takes into account the above and is configured so as to have the reset circuit 37. The reset circuit 37 is provided between the terminals of the metallic subscriber line 1 (both end terminals of the load resistance r). The reset circuit 37 detects the polarity in the normal feed from the line terminal 50, and generates a reset signal RS which resets the main signal circuit 31 coupled to the above terminals in accordance with the polarity detected. Hence, it is possible to avoid occurrence of a problem in the operation sequence of the network terminal 30. In other words, there is no need to modify the existing operation sequence of the network terminal 30.

Figure 8:
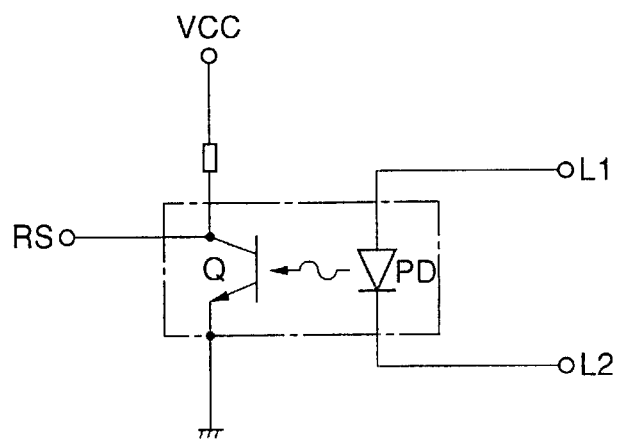
FIG. 8 is a circuit diagram of a reset circuit shown in FIG. 5.

FIG. 8 is a circuit diagram of the reset circuit 37 used in the first embodiment of the present invention. The reset circuit 37 is formed of a photo-isolator made up of a primary-side photodiode PD and a secondary-side phototransistor Q. If the potential of a feed terminal L1 is higher than that of a feed terminal L2 (the polarity at the time of the normal feed), a current flows through the photodiode PD of the photo-isolator 37, which is thus illuminated. Hence, the phototransistor Q is turned ON, and the reset signal RS is switched to the low level. Hence, the main signal circuit 31 is forced to be reset.

In contrast, if the potential of the feed terminal L1 is lower than that of the feed terminal (the polarity at the time of the reverse feed), no current flows in the photodiode PD, which is thus not illuminated. In this case, the phototransistor Q is turned OFF and the reset signal RS is at the high level. Hence, the main signal circuit 31 is released from the reset state.

A smaller amount of power is preferably consumed with a larger value of the termination resistance r at the time of the normal feed. With the above in mind, the following modification can be made. For example, another termination resistor r' is provided in addition to the termination resistor r (r<r'). The reverse feed from the line terminal 50 is terminated with the resistor r having a comparatively small resistance, and the normal feed therefrom is terminated with the resistor r' having a comparatively large resistance. The switching between the resistors r and r' can be implemented by a switch circuit which selectively connects either the resistor r or the resistor r' in response to the output signal of the reset circuit 37.

Figure 9:
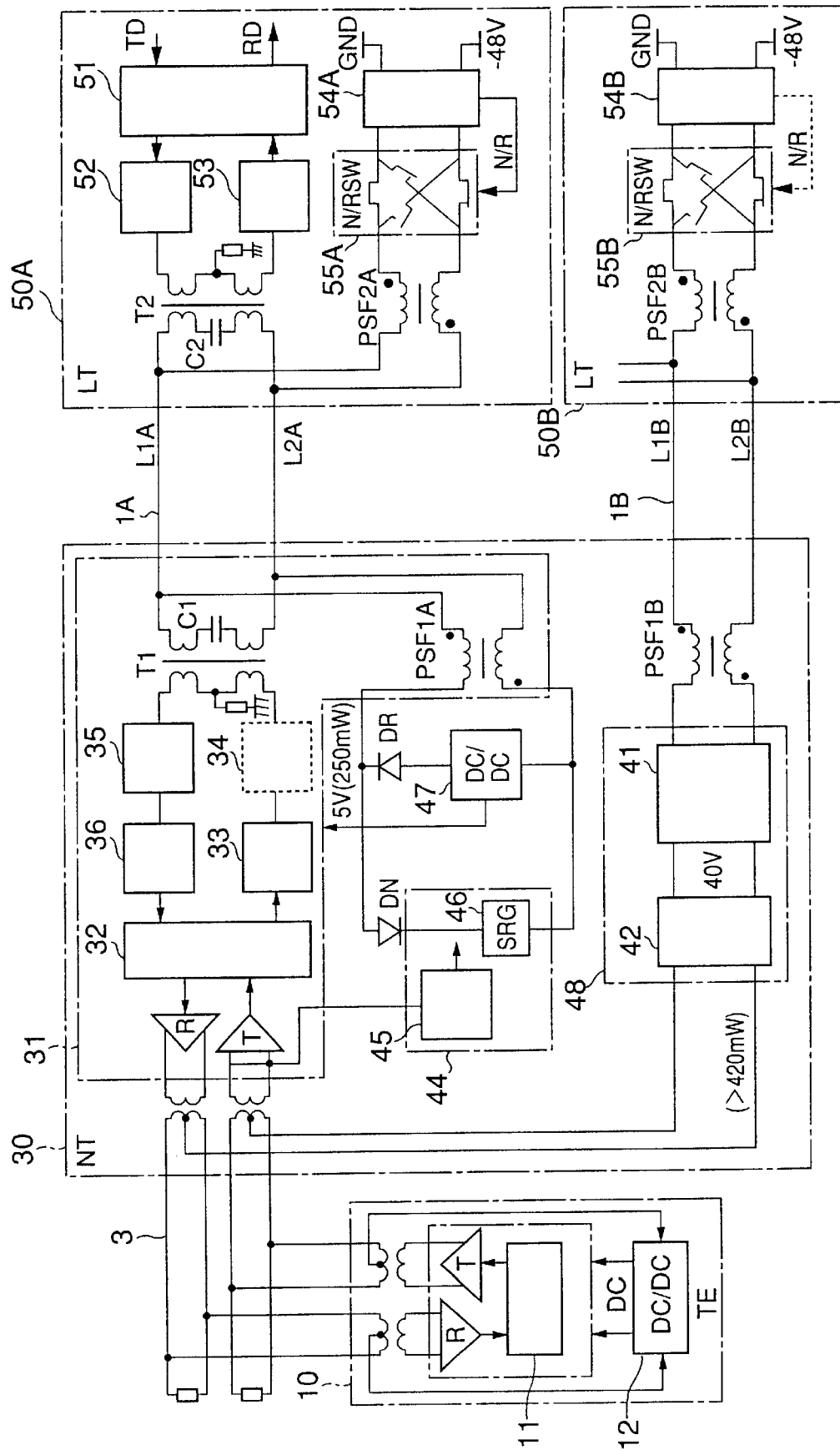
FIG. 9 is a block diagram of a long-distance transmission system according to a second embodiment of the present invention.

FIG. 9 is a block diagram of an LT-NT long-distance transmission system according to a second embodiment of the present invention. In FIG. 9, parts that are the same as those shown in the previously described figures are given the same reference numbers. The system shown in FIG. 9 is configured so that the transmit and receive gains of the network terminal 30 are increased as in the case of the system shown in FIG. 5 and the network terminal 30 is supplied with the remote feed separately from line terminals 50A and 50B.

More particularly, the system shown in FIG. 9 includes the first and second line terminals 50A and 50B, and first and second two-wire metallic subscriber lines 1A and 1B. The network terminal 30 is configured as described below according to the second embodiment of the present invention. The components 44–47 and the diode DR are the same as those shown in FIG. 2 and are associated with the first line terminal 50A. The network terminal 30 includes a terminal feed circuit 48, which performs a remote feed from the network terminal 30 to the terminal equipment 10 on the, basis of the remote feed from the second line terminal 50B. The terminal feed circuit 48 is made up of a constant-voltage circuit 41 and a current limit circuit 42. The constant-voltage circuit 41 is of a series regulation type. The current limit circuit 42 is used to limit a rush current which flows in the terminal equipment 10 at the time of power on so that a slow start can be realized.

The first and second line terminals 50A and 50B (two lines) and the metallic subscriber lines 1A and 1B are provided with respect to the single network terminal 30. The remote feed necessary to operate the network terminal 30 is supplied by the first line terminal 50A via the metallic subscriber line 1A. The remote feed necessary to operate the terminal equipment 10 is supplied by the second line terminal 50B via the metallic subscriber line 1B.

First, the remote feed by the first line terminal 50A will be described.

When it is assumed that the main signal circuit 31 needs, at the time of the reverse feed, a power of 250 mW which is as much as that conventionally required and that the DC/DC converter 47 has a transformation efficiency of 70%, the input power Pn of the network terminal 30 can be expressed as follows:

$$Pn = 250 \text{ mW}/0.7 = 357 \text{ mW} \approx 360 \text{ mW}.$$

The input power Pi of 360 mW thus obtained is as small as 36% of the input power Pi 1000 mW. Hence, it is possible to transform power as much as 64% of 1000 mW to the line resistance loss and thus use a long metallic line 1A as compared to the conventional metallic line.

More particularly, it will now be assumed that the reverse feed current IL of the line terminal 50A is 35.1 mA as in the case of the conventional system. The input voltage Vn of the network terminal 30 sufficient to cover the input power Pn (360 mW) of the network terminal 30 can be obtained as follows:

$$Vn = Pn/I_L = 360 \text{ mW}/35.1 \text{ mA} = 10.26 \text{ V}$$

$$\approx 10.3 \text{ V}.$$

The following can be seen from the above calculation. Conventionally, the input voltage Vi equal to at least 28.5 V is required to ensure the input power Pi equal to 1000 mW in the network terminal 30 at the time of the reverse feed in which IL=35.1 mA. In contrast, according to the second embodiment of the present invention, the input voltage Vi equal to only 10.3 V at minimum is required to ensure Pi of 1000 mW. Hence, there is a voltage difference equal to 18.2 V (28.5 V–10.3 V) between the second embodiment of the present invention and the conventional art. The difference equal to 18.2 V can newly be assigned to the loss in the metallic subscriber line 1A. The voltage 18.2 V can be converted into the line resistance value RL' as follows:

$$R_{L'} = 18.2 \text{ V}/35.1 \text{ mA} = 518.5 \text{ }\Omega.$$

Thus, the metallic subscriber line can be extended by a distance equal to approximately 519 Ω. The total line resistance is equal to 1331 ohms, which is approximately 1.6 times the limited value (equal to 812 ohms) of the line resistance in the conventional art. The increased distance of the metallic subscriber line results from the fact that the power (equal to 420 mW) to be supplied to the terminal equipment 10 is no longer needed.

The second line terminal 50B will now be described. In this case, the constant-voltage circuit 41 may be formed of a series regulator or a DC/DC converter.

When a series regulator is used as the constant-voltage circuit 41, the input voltage Vt of the circuit 41 is required to be greater than or equal to 40 V. In this case, the line terminal 50B is the normal feed.

If it is expected that a loss approximately equal to 1 mA occurs in the series regulator source 41, the input voltage Vt of the circuit 41 should be equal to or greater than 41 V. In order to supply a power of 420 mW to the terminal equipment 10, a current It to be supplied to the bus line 3 should approximately be equal to 11 mA as follows:

It=420 mW/40V=10.5 mA.

Hence, the current IL flowing through the metallic subscriber line 1B is equal to 12 mA including the loss of 1 mA.

When the current IL equal to 12 mA flows through the metallic subscriber line 1B, a voltage drop of 9.7 V occurs in the metallic subscriber line 1B due to the line resistance limit (812 ohms) in the reverse feed (812Ω×12 mA=9.7 V). If the output voltage Vo of the line terminal 50B is constant at 57 V, the input voltage Vt that can be applied to the series regulator source 41 can be calculated as follows:

Vt=57 V−9.7 V=47.3 V.

Hence, a voltage margin of 6.3 V (equal to 47.3 V−41 V) is available. Hence, the margin 6.3 V can be assigned to the loss of the metallic subscriber line 1B and can be converted into the line resistance value RL' as follows:

RL'=6.3 V/12 mA=525 Ω.

Hence, the metallic subscriber line can be extended by a distance approximately equal to 525 Ω. Hence, the total line resistance value of the metallic subscriber line is equal to 812 Ω+525 Ω=1337 Ω, which is approximately 1.6 times the distance of the conventional line resistance limit value (812 Ω) in the reverse feed.

Hence, when the constant-voltage circuit 41 is formed of the series regulator source, the normal feed having a comparatively small loss is applied to the line terminal 50B, so that the metallic subscriber line 1B can be made to have the distance approximately equal to 1.6 times the conventional available distance.

A case will be described where the constant-voltage circuit 41 is formed of a DC/DC converter. The DC/DC converter 41 does not have any particular limitation on the input voltage Vt as long as the power condition for the input and output is satisfied. Hence, the line terminal 50B can perform either the normal feed or the reverse feed. The following description is directed to using the reverse feed which requires the more strict feed condition (a larger line loss) than the normal feed.

It will now be assumed that the power needed in the terminal equipment 10 at the time of the reverse feed from the line terminal 50B is 420 mW, the same as that used in the conventional system, and that the DC/DC converter 41 has a transformation efficiency of 70%. In this case, the DC/DC converter 41 is sufficient to cave an input power Pt of 600 mW.

When it is further assumed that the reverse feed current IL of the line terminal LT 50B is equal to 35.1 mA, the following input voltage Vt of the network terminal 30 is required to ensure the input power Pn (600 mW) of the network 30:

Vt=Pt/IL=600 mW/35.1 mA=17.09 V.

That is, the input voltage Vt of the network terminal 30 is approximately equal to 17 V.

In contrast, the input voltage Vi conventionally needed in the network terminal 30 is equal to 28.5 V. Hence, it is possible to assign a voltage drop of 11.5 V (=28.5 V−17 V) to the loss of the metallic subscriber line 1B. The above voltage drop can be converted into the line resistance value RL' as follows:

RL'=11.5 V/35.1 mA=327.6 Ω.

Hence, an extension of 328 Ω is available, and a total length of 1140 Ω(=812 Ω+328 Ω) is available. The total length is equal to 1.4 times the conventionally available distance equal to the line resistance limit value (812 Ω). This results from a reduction of 250 mW in the power fed to the main signal board 31.

The above analysis with regard to the reverse feed substantially holds true for the normal feed from the line terminal 50B to the DC/DC converter 41. The normal feed having a comparatively small line loss is advantageous to the line terminal 50B. In the second embodiment of the present invention, the line terminal 50B always performs the normal feed.

A description will now be given of a third embodiment of the present invention.

The third embodiment of the present invention corresponds to an improvement in the transmission system of the network terminal 30 including the transmit amplifier 34 used in the above-mentioned first and second embodiments of the present invention.

If the transmit amplifier 34 has a flat amplification characteristic, the waveform of the transmit signal will not be distorted as long as the 50 dB upper limit of the AC loss is satisfied. In contrast, the transmit amplifier 34 amplifies the transmission level by +α dB, so that the total subscriber line loss is equal to 50 dB +α dB. In this case, the waveform of the transmit signal with the transmission level increased by +α dB may be secondary slant amplifier, and is approximated so that the frequency v. AC loss characteristic of the 0.5-mm paper insulation cable is the gain of the $\sqrt{f}$ equalization amplifier.

Figure 12:
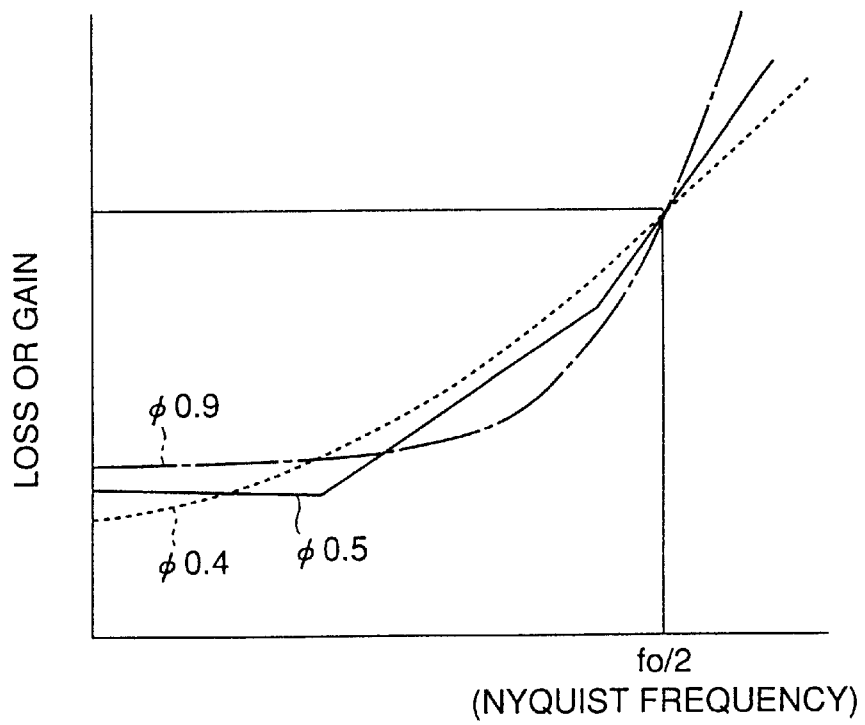
FIG. 12 is a graph showing a relationship between frequency characteristics of metallic lines and the determined √f equalization.

However, in practice, there are deviations of the frequency v. AC loss characteristics of the actual metallic lines from the $\sqrt{f}$ equalization characteristic, as shown in FIG. 12. This is because the frequency v. AC loss characteristic depends on the diameter of the metallic line. Such deviations result in distortion of the waveform of the signal propagated through the metallic line.

As shown in FIG. 12, the characteristics of the 0.4-mm and 0.9-mm metallic lines deviate from the $\sqrt{f}$ equalization characteristic. More particularly, the 0.4-mm metallic line has a characteristic such that the loss of the 0.4-mm line is greater than the gain ($\sqrt{f}$) at frequencies lower than the Nyquist frequency while the gain is greater than the loss at frequencies higher than the Nyquist frequency. The waveform after the $\sqrt{f}$ equalization includes more high-frequency components than those included in the original one. In contrast, the 0.9-mm metallic line has a characteristic such that the waveform after the $\sqrt{f}$ equalization includes more low frequency components (lower than the Nyquist frequency) than those of the original one.

Figures 13A, 13B, 13C:
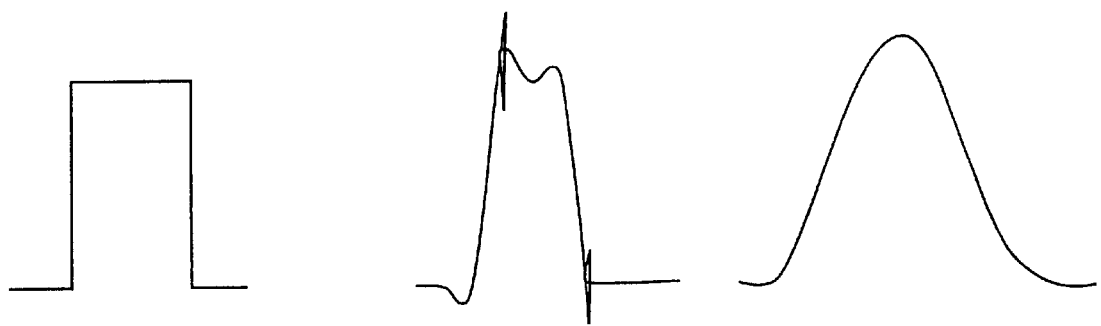
FIGS. 13A, 13B and 13C are waveform diagrams of an original waveform. and √f-equalized waveforms thereof.

FIGS. 13A, 13B and 13C respectively illustrate the original waveform, a waveform after the signal propagated through the 0.4-mm metallic line is subjected to the $\sqrt{f}$ equalization, and a waveform after the signal propagated through the 0.9-mm metallic line is subjected to the $\sqrt{f}$ equalization. It can be seen from FIGS. 13A, 13B and 13C that the waveform obtained after the $\sqrt{f}$ equalization includes a narrower pulse width and more high-frequency components as the diameter of distorted during the transmission over the transmission line equal to 50 dB+α dB.

Figure 10:
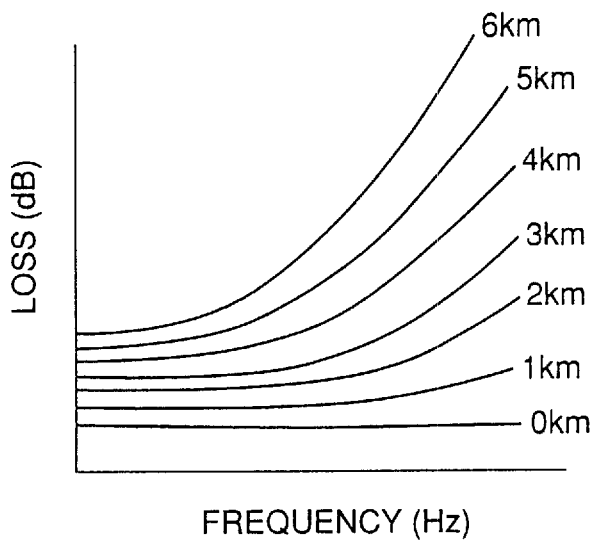
FIG. 10 is a graph of a frequency v. AC loss characteristic of a two-wire metallic line.

FIG. 10 is a graph of frequency v. AC loss characteristics due to the distributed coefficient of the metallic line. The horizontal line denotes the frequency (Hz) and the vertical line denotes the AC loss of the metallic line. As shown in the graph of FIG. 10, the AC loss is increased as the frequency becomes higher. In other words, the signal is more liable to pass through the metallic line as the frequency becomes lower. Further, as the distance of the metallic line increases, the AC loss becomes greater.

The frequency v. AC loss characteristics of the subscriber line depends on the type of metallic line and the thickness or diameter thereof. There are different types of metallic lines, such as a metallic line using lead, a metallic line employing paper insulation and a metallic line so called a CCP cable. There are also different diameters ranging from 0.4 mm to 0.9 mm. A frequency v. AC loss characteristic obtained by averaging the frequency v. AC loss characteristics of the different types of metallic lines ranging from 0.4 mm to 0.9 mm is closest to that of the 0.5-mm paper insulation cable. Hence, the signal which is propagated through the metallic line and thus deteriorates is equalized so that a loss calculated with reference to that of the 0.5-mm paper insulation cable is corrected as a gain. Thus, the distorted signal can be shaped into a signal with the least. waveform distortion. The above equalization is called √f equalization.

Figure 11:
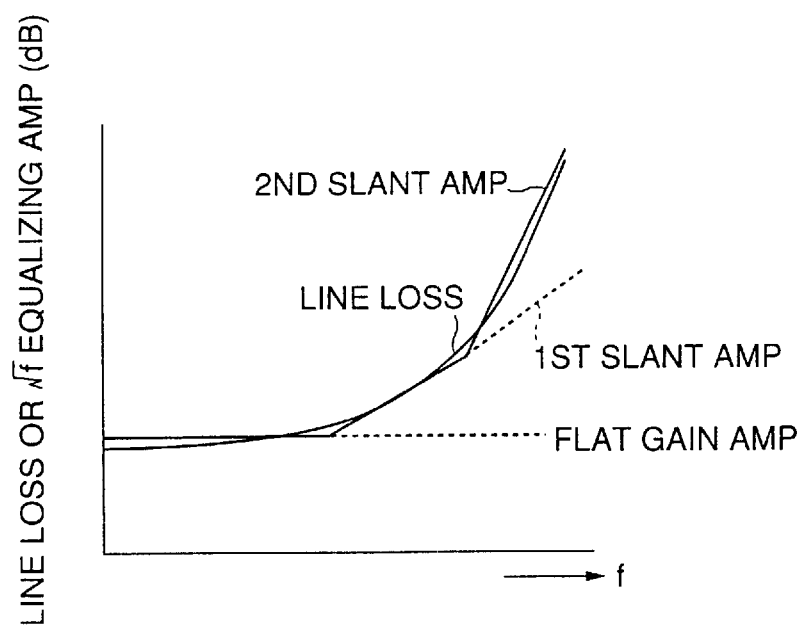
FIG. 11 is a graph showing a line loss of a 0.5-mm paper insulation cable and a √f equalization thereof.

The above correction is implemented as shown in FIG. 11. The √f equalization is realized by a √f equalization amplifier including a flat gain amplifier, a primary slant amplifier and a the line decreases and includes a longer pulse width and more low-frequency components as the diameter of the line increases.

With the above in mind, the transmit amplifier 34 used in the third embodiment of the present invention is designed to amplify the signal so that it has a waveform suitable for the frequency V. AC loss characteristic of the line that depends on the diameter of the metallic subscriber line.

Figure 14:
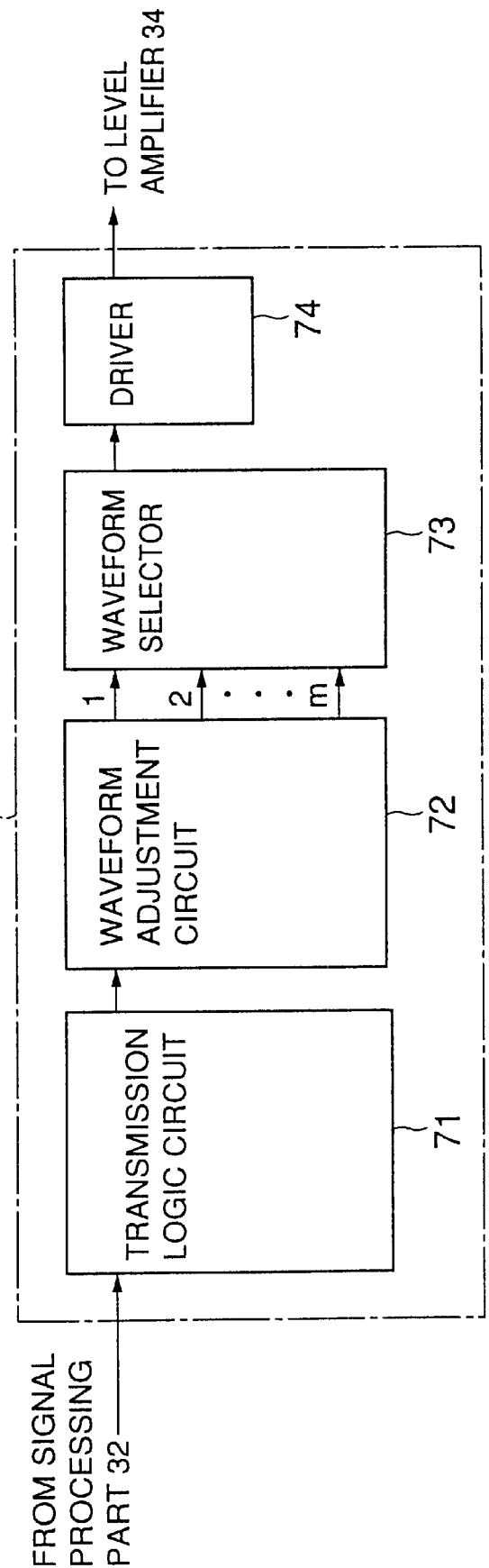
FIG. 14 is a block diagram of a transmission circuit used in a third embodiment of the present invention.

FIG. 14 is a block diagram of the signal transmission circuit 33 employed in the third embodiment of the present invention. The signal transmission circuit 33 shown in FIG. 14 is made up of a transmission logic circuit 71, a waveform adjustment circuit 72, a waveform selector 73 and a transmission driver 74. The transmission logic circuit 71 buffers the transmission signal from the signal processing part 32, and outputs the transmission signal to the waveform adjustment circuit 72. The waveform adjustment circuit 72 generates signals used to adjust the waveform of the transmission signal so that it is suitable for the frequency v. AC loss characteristic of the metallic subscriber line 1. For example, the signals generated by the waveform adjustment circuit 72 are used to adjust the pulse width of the transmission signal. The waveform selector 73 selects one of the signals generated by the waveform adjustment circuit 72, so that the transmission signal has an adjusted waveform suitable for the metallic subscriber line 1 through which the transmission signal is propagated. The transmission driver 74 converts the transmission signal having the adjusted waveform into the AMI signal suitable for the transmission over the metallic subscriber line 1. The selector 73 is externally supplied with a control signal now named selector switch signal.

Alternatively, the waveform adjustment circuit 72 may generate a plurality of adjusted waveforms of the transmission signal. In this case, the waveform selector 73 selects one of the signals generated by the waveform adjustment circuit 72.

Figure 15:
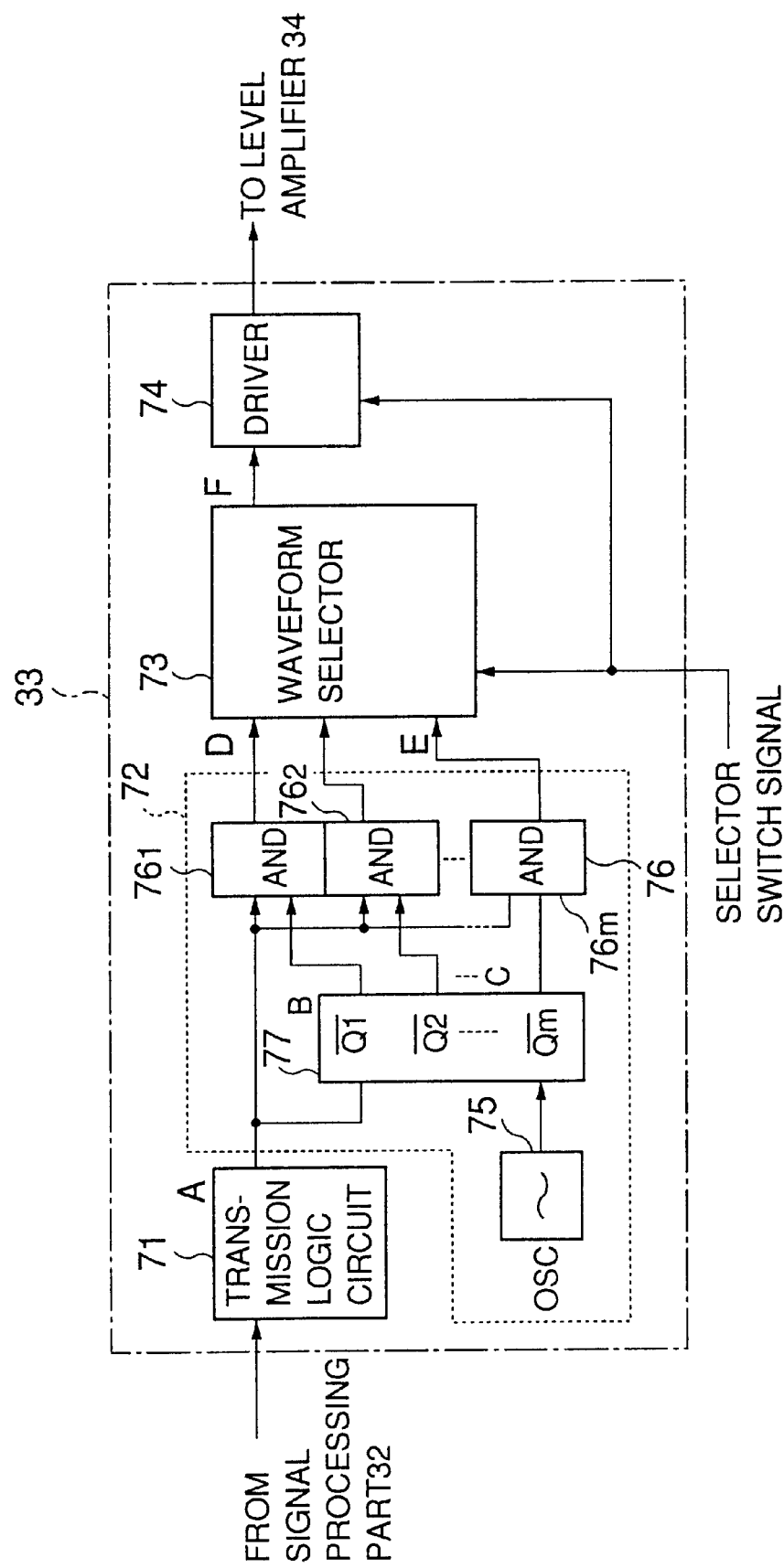
FIG. 15 is a block diagram of a configuration of the transmission circuit shown in FIG. 14.

FIG. 15 shows a structure of the waveform adjustment circuit 72, which is made up of an oscillator 75, a shift register 77 and an 1:n selector 76 composed of AND gates 761–76m. The shift register 77 receives the transmission signal from the transmission logic circuit 71 and a clock signal generated by the oscillator 75, and shifts the transmission signal in synchronism with the clock signal.

Figure 16:
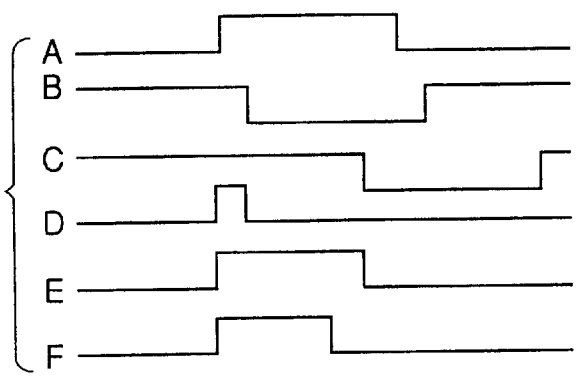
FIG. 16 is a timing chart of an operation of the transmission circuit shown in FIG. 15.

FIG. 16 is a timing chart of signals observed at nodes A–F shown in FIG. 15. The transmission signal A is shifted by the shift register 77, which outputs signals /Q1–/Qm. FIG. 16 shows only signals B and C among the output signals /Q1–/Qm. The AND gates 761–76m respectively receive the transmission signal A and the output signals /Q1–/Qm. and generate signals obtained by the respective AND operations thereon. FIG. 16 shows only signals D and E among the output signals of the AND gates 761–76m.

The waveform selector 73 selects one of the output signals of the AND gates 761–76m in accordance with a selector switch signal externally applied thereto. In the case shown in FIG. 16, signal F is selected and output to the transmission driver 74. The selected signal F is a transmission signal having an adjusted waveform, more particularly, having a waveform having a pulse width shorter than the original pulse width of the transmission signal. The pulse width thus adjusted is suitable for the transmission over the metallic subscriber line 1.

Figure 17:
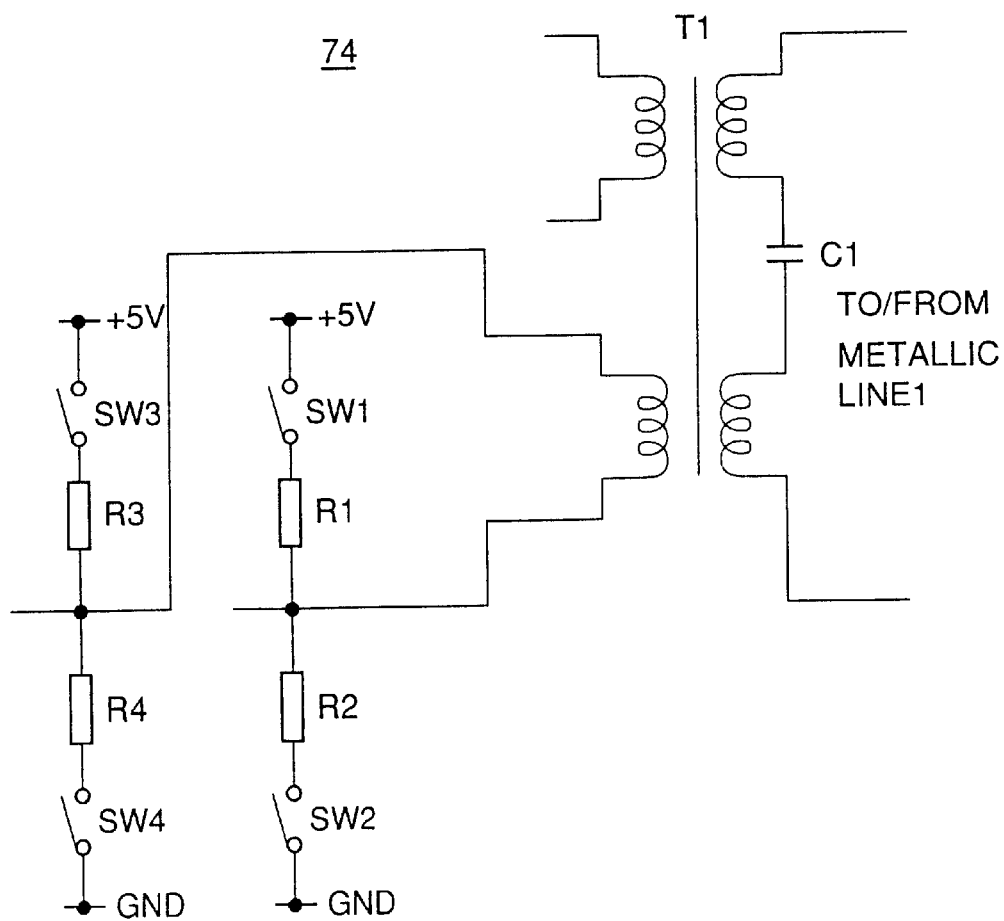
FIG. 17 is a circuit diagram of a transmission driver shown in FIG. 15.

FIG. 17 is a circuit diagram of the transmission driver 74 shown in FIGS. 14 and 15. The transmission driver 74 converts the pulse signal from the waveform selector 73 into the AMI signal. The transmission driver 74 is made up of switches SW1, SW2, SW3 and SW4 and resistors R1, R2, R3 and R4. As has been described previously, the transformer T1 has an increased transmission winding ratio of the transformer T1 so that the transmission level can be increased by α dB. The above setting of the winding ratio corresponds to the level amplifier 34 of the main signal circuit 31.

When the positive pulse of the transmission signal is sent to the metallic subscriber line 1, the switches SW1 and SW4 are turned ON. In contrast, when the negative pulse of the transmission signal is sent to the metallic subscriber line 1, the switches SW2 and SW3 are turned ON so that the matching of the receive impedance at the secondary winding of the transformer T1 connected to the metallic subscriber line 1 can be established.

Figure 18:
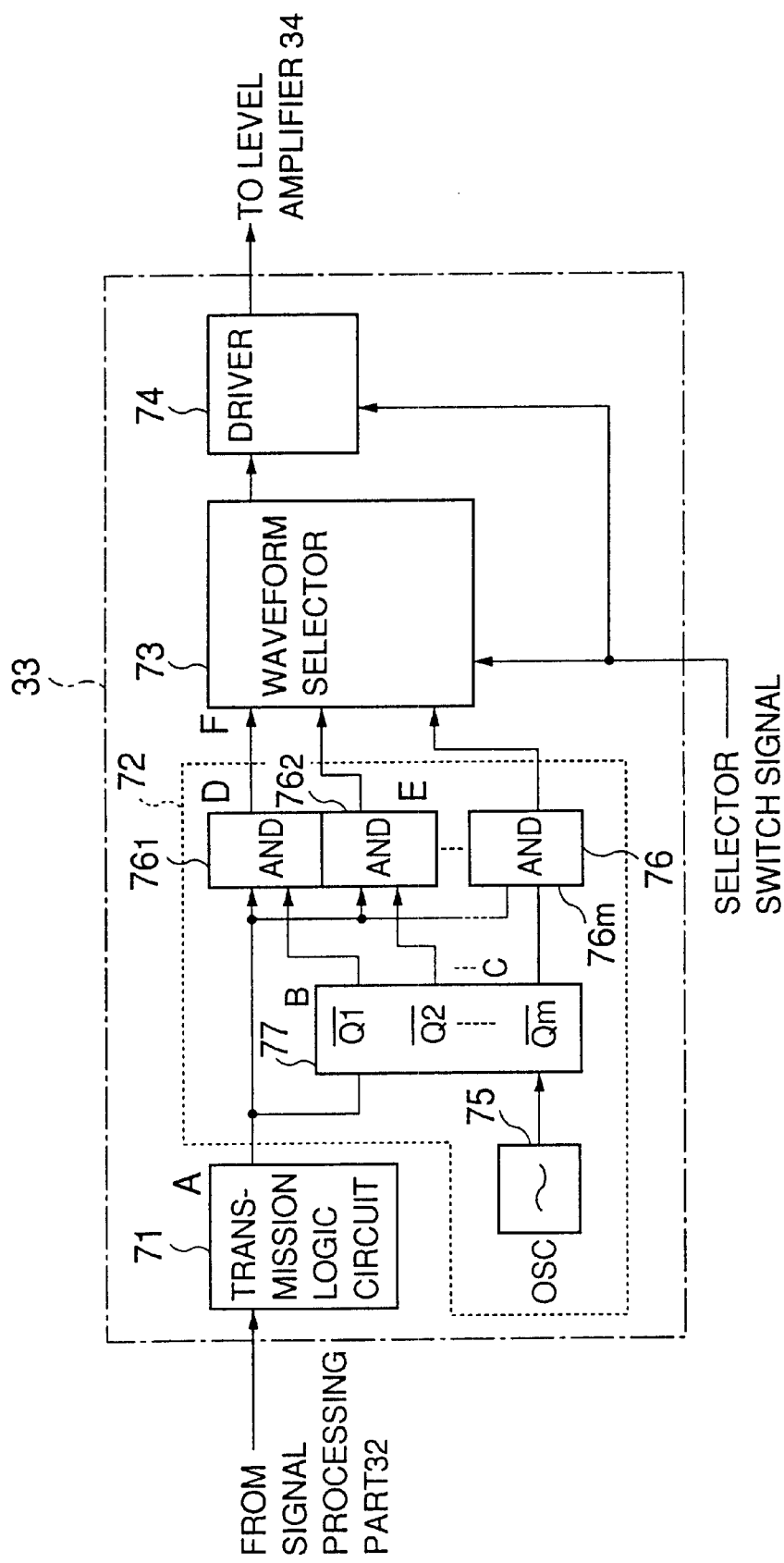
FIG. 18 is a circuit diagram of a modification of the transmission circuit shown in FIG. 15.

FIG. 18 is a block diagram of another configuration of the signal transmission circuit 33. The signal transmission circuit 33 has the function of changing not only the waveform of the transmission signal (more particularly, the pulse width of the transmission signal) but also the transmission level. In this regard, the transmission circuit 33 includes the function of the level amplifier 34 shown in FIGS. 4 and 5. In this case, the transformer T1 may have the ordinary transmission winding ratio (α=0 dB) or an increased transmission winding ratio. In the latter case, the increased transmission level α is realized by the transmission driver 74 only or by both the transmission driver 74 and the transformer T1.

Figure 19:
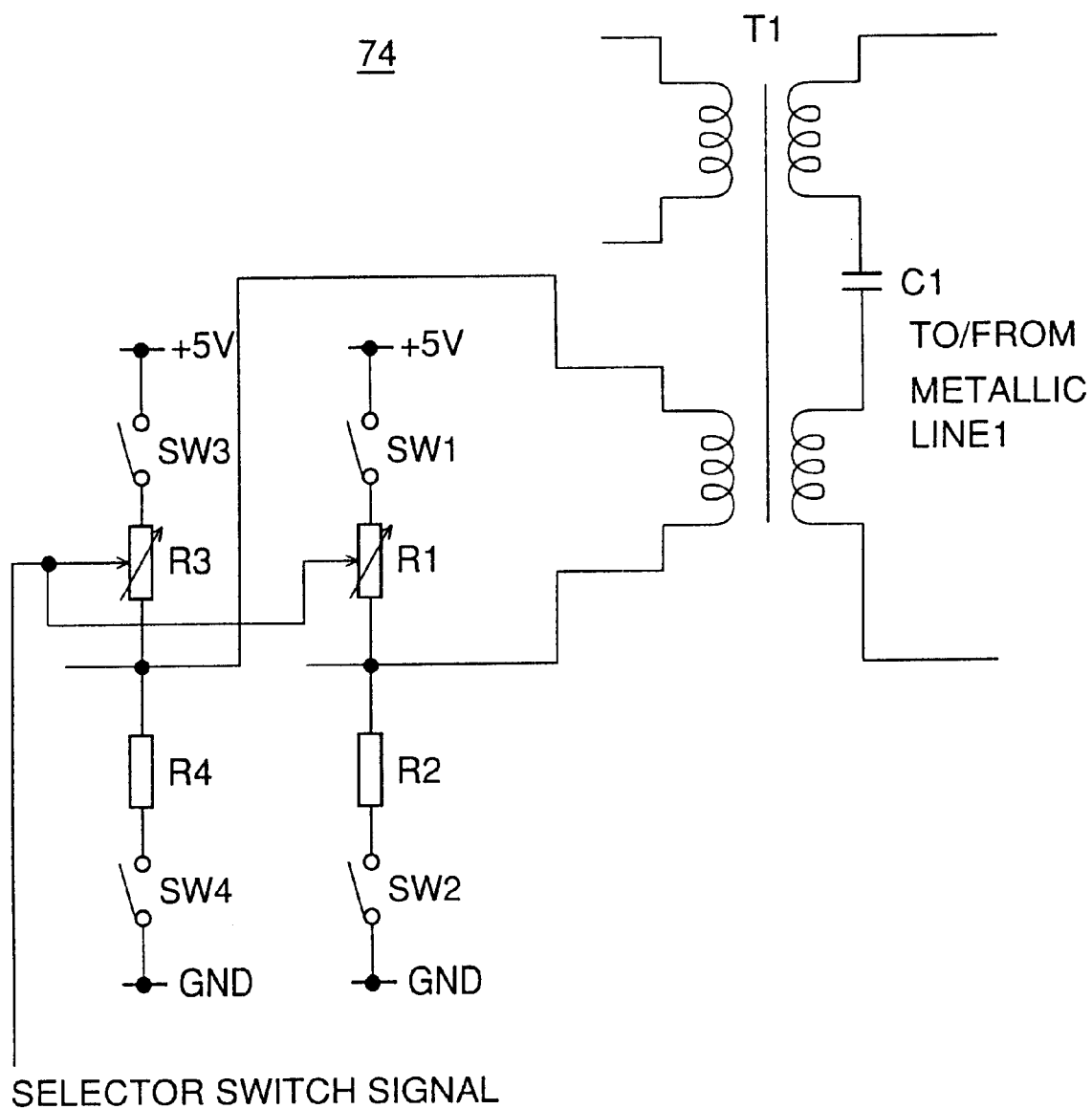
FIG. 19 is a circuit diagram of a transmission driver shown in FIG. 18.

FIG. 19 is a circuit diagram of the transmission driver 74 shown in FIG. 18. In FIG. 19, parts that are the same as those shown in FIG. 17 are given the same reference numbers. The resistors R1 and R3 shown in FIG. 19 are variable resistors, which are controlled by the selector switch signal which is also applied to the waveform selector 73. The selector switch signal is information indicative of the frequency v. AC loss characteristic of the metallic subscriber line 1. The resistance values of the variable resistors R1 and R3 correspond to the frequency v. AC loss characteristics of various metallic subscriber lines. In response to the selector switch signal, the variable resistors R1 and R3 are adjusted so as to have resistance values suitable for the metallic subscriber line 1. Hence, it is possible to change not only the pulse waveform of the transmission signal but also the transmission level.

The configuration shown in FIG. 19 can be applied to the signal transmission circuit 33 shown in FIG. 5. Hence, the transmission level can be adjusted so that it is much suitable for the frequency v. AC loss characteristic of the metallic transmission line 1 actually used.

Figure 20:
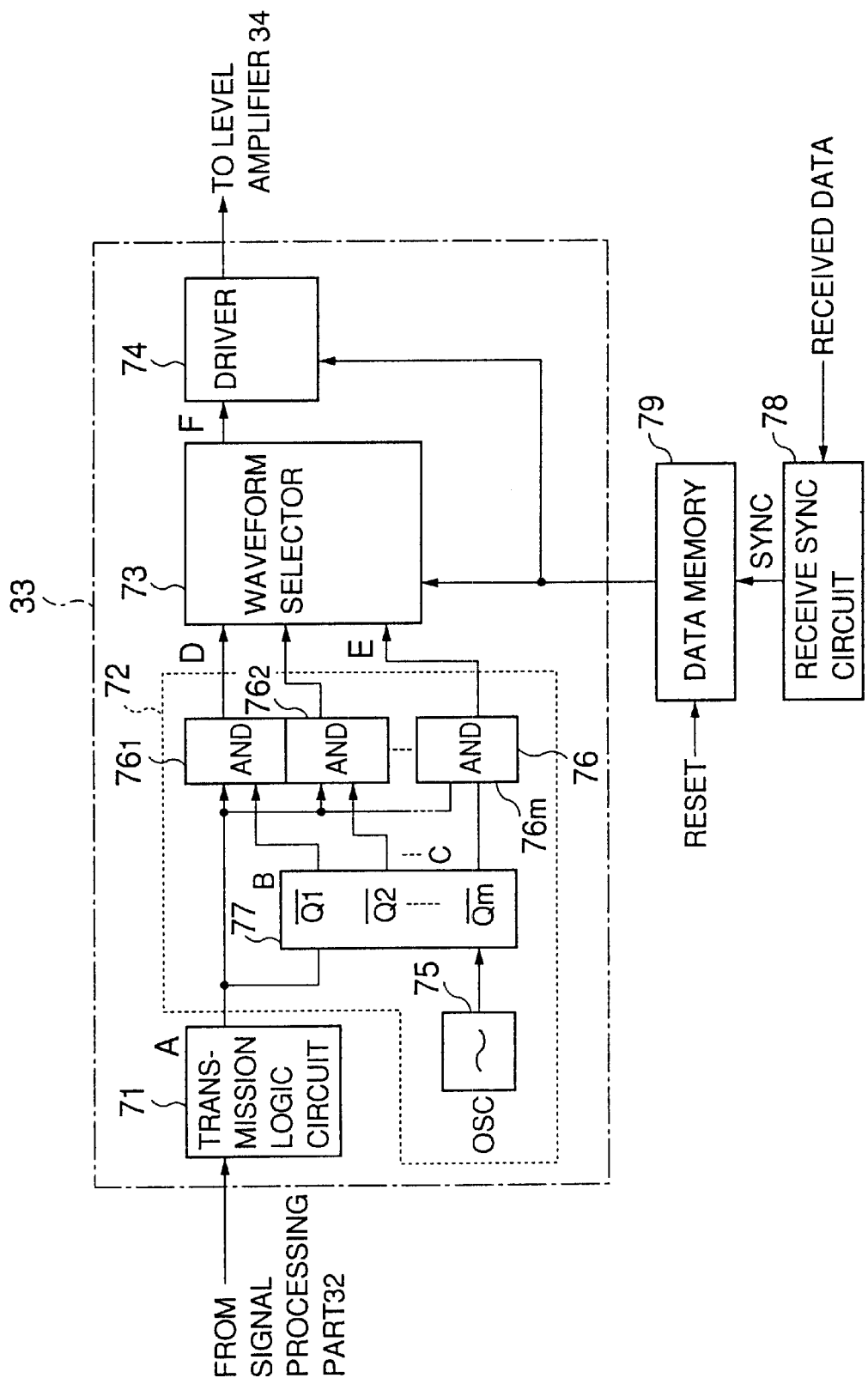
FIG. 20 is a circuit diagram of a modification of the transmission circuit shown in FIG. 18.

FIG. 20 is a block diagram of a modification of the signal transmission circuit 33 shown in FIG. 18. In FIG. 20, parts that are the same as those shown in FIG. 18 are given the same reference numbers. The signal transmission circuit 33 shown in FIG. 20 has the function of automatically determining the combination of the pulse width and the transmission level suitable for the metallic subscriber line 1. The above function is implemented by further providing a receive synchronizing circuit 78 and a data memory 79. The receive synchronizing circuit 78 is provided in, for example, the signal processing part 32 shown in FIGS. 4 and 5. The data memory 79 is formed of a non-volatile memory such as a disk apparatus or a non-volatile semiconductor memory.

The data memory 79 stores items of data which correspond to the respective combinations of the pulse width and the transmission level. Each of the combinations satisfy a condition that the transmission power is constant. Examples of such combinations are illustrated in FIGS. 21A, 21B and 21C. Waveforms #1, #2 and #3 have mutually different pulse widths and transmission levels but have an identical transmission power. That is, the following equation stands in each combination or waveform:

$$W \times H^2 = A$$

where W denotes the pulse width, H denotes the transmission level and A denotes a constant value.

After a reset signal is externally applied to the data memory 79, a training communication is initiated and then the items of data are sequentially read therefrom until the receive synchronizing circuit 78 pulls the receive system in synchronization. Then, the item of data sent when the receive synchronizing circuit 78 pulls the receive system in synchronization is latched in a register area provided in the data memory 79. Then, the item of data latched in the register area is supplied to the waveform selector 73 and the transmission driver 74 as the selector switch signal after the synchronization is established. The latched data is also used when the network terminal 30 is powered on again. Hence, it takes a reduced time to establish the synchronization after power on. The data latched in the register area given in the data memory 79 can be reset by the reset signal.

According to the third embodiment of the present invention, it is possible to improve the problem in which the equalizing capability cannot be improved by α dB even by merely amplifying the transmission level by α dB and realize suitable long-distance transmission.

The first through third embodiments of the present invention and modifications thereof described above are involved with the Ping-Pong transmission system. However, the present invention includes other transmission systems such as a hybrid transmission system and a frequency-division multiplexing system.

The first through third embodiments of the present invention and modifications thereof described above are involved with an application to the ISDN basic services. However, the present invention can be applied to all data transmission systems which employ the same type of power feed system as described above.

The transmission level of the signal transmitted by the line terminal 50 may be amplified so as to be equal to 50 dB+α dB. However, with this arrangement, modification of the existing line terminal 50 is required.

Finally, the present invention is not limited to the specifically disclosed embodiments and modifications, and modifications and variations may be made without departing from the scope of the invention.

What is claimed is:

1. A long-distance transmission system comprising:
   a network terminal that accommodates terminal equipment; and
   a line terminal connected to the network terminal via a two-wire metallic subscriber line,
   wherein the network terminal comprises:
   an amplifier, which amplifies a transmission level of a transmission signal to be transmitted to the line terminal via the two-wire metallic subscriber line on the basis of a characteristic of the two-wire transmission line;
   a local power unit which is connected to utility electricity, and supplies the utility electricity to the network terminal and to the terminal equipment such that the utility electricity drives the network terminal and the terminal equipment; and
   a termination resistor which terminates a remote feed power supplied via the two-wire metallic subscriber line from the line terminal, and has a resistance substantially lower than that of a resistor suitable in a configuration in which the remote feed power drives the network terminal and the terminal equipment.

2. The long-distance transmission system as claimed in claim 1, wherein the amplifier amplifies the transmission level of the transmission signal so that the transmission signal is applied to the two-wire metallic subscriber line at a level exceeding an AC loss limit of the two-wire metallic subscriber line.

3. The long-distance transmission system as claimed in claim 1, wherein the network terminal comprises a circuit which adjusts a waveform of the transmission signal so that an adjusted waveform thereof is suitable for the characteristic of the two-wire metallic transmission line.

4. The long-distance transmission system as claimed in claim 1, wherein the network terminal comprises a circuit which adjusts the transmission level of the subscriber signal.

5. The long-distance transmission system as claimed in claim 3, wherein the network terminal comprises a circuit which adjusts the transmission level of the transmission signal so that both the transmission level and the waveform can be adjusted.

6. The long-distance transmission system as claimed in claim 1, wherein the network terminal comprises another amplifier which amplifies a reception level of a signal which is received from the line terminal via the two-wire metallic subscriber line.

7. A long-distance transmission system comprising:
   a network terminal that accommodates terminal equipment; and
   a line terminal connected to the network terminal via a two-wire metallic subscriber line,
   the network terminal comprising an amplifier, which amplifies a transmission level of a transmission signal to be transmitted to the line terminal via the two-wire metallic subscriber line on the basis of a characteristic of the two-wire transmission line;
   wherein the network terminal is fed with electricity from the line terminal via the two-wire metallic subscriber line and the terminal equipment is fed with electricity from another line terminal via another two-wire metallic subscriber line.

8. The long-distance transmission system as claimed in claim 3, wherein the circuit which adjusts the waveform of the transmission signal so that a pulse width of the transmission signal is changed.

9. The long-distance transmission system as claimed in claim 7, wherein the network terminal and the terminal equipment are fed with electricity from the line terminal via the two-wire metallic subscriber in either a normal feed or a reverse feed depending on whether the network terminal is in a working state or a standby state and is always fed, in the normal feed, with electricity from another line terminal via another two-wire metallic subscriber line.

10. A network terminal connectable to a two-wire metallic subscriber line, comprising:
   a transmission circuit that outputs a transmission signal; and
   an amplifier part which amplifies a transmission level of the transmission signal which is to be sent to the two-wire metallic subscriber line;
   a local power unit which is connected to utility electricity, and supplies the utility electricity to the network terminal and to the terminal equipment such that the utility electricity drives the network terminal and the terminal equipment; and
   a termination resistor which terminates a remote feed power supplied via the two-wire metallic subscriber line from a line terminal, and has a resistance substantially lower than that of a resistor suitable in a configuration in which the remote feed power drives the network terminal and the terminal equipment.

11. The network terminal as claimed in claim 10, where in the amplifier part amplifies the transmission level of the transmission signal so that the transmission signal is applied to the two-wire metallic subscriber line at a level exceeding an AC loss limit of the two-wire metallic subscriber line.

12. The network terminal as claimed in claim 10, further comprising a circuit which adjusts a waveform of the transmission signal so that an adjusted waveform thereof is suitable for a characteristic of the two-wire metallic subscriber line.

13. The network terminal as claimed in claim 10, further comprising a circuit which adjusts the transmission level of the transmission signal.

14. The network terminal as claimed in claim 12, further comprising a circuit which adjusts the transmission level of the transmission signal so that both the transmission level and the waveform can be adjusted.

15. The network terminal as claimed in claim 10, further comprising a receive amplifier which amplifies a reception level of a signal which is received from a line terminal via the two-wire metallic subscriber line.

16. A network terminal connectable to a two-wire metallic subscriber line, comprising:
   a transmission circuit that outputs a transmission signal;
   an amplifier part which amplifies a transmission level of the transmission signal which is to be sent to the two-wire metallic subscriber line;
   a first feed part which receives electricity for the network terminal from a first line terminal via the two-wire metallic subscriber line; and
   a second feed part which receives electricity for terminal equipment connected to the network terminal from a second line terminal via a second two-wire metallic subscriber line.

17. The network terminal as claimed in claim 12, wherein the circuit adjusts the waveform of the transmission signal so, that a pulse width of the transmission signal is changed.

18. The network terminal as claimed in claim 10, wherein:
   the amplifier part. is a part of a transformer via which the network terminal is connected to the two-wire metallic subscriber line;
   the part of the transformer has a winding ratio with which the transmission level of the transmission signal can be boosted.

19. The network terminal as claimed in claim 10, further comprising:
   a first circuit which generates a plurality of waveforms of the transmission signal; and
   a second circuit which selects one of the plurality of waveforms suitable for a characteristic of the two-wire metallic subscriber line.

20. The network terminal as claimed in claim 19, further comprising a third circuit which adjusts the transmission level of the transmission signal so that an adjusted transmission level is suitable for the two-wire metallic subscriber line.

21. The network terminal as claimed in claim 10, further comprising:
   a first circuit which generates a plurality of waveforms of the transmission signal;
   a second circuit which selects, in response to a control signal, one of the plurality of waveforms suitable for a characteristic of the two-wire metallic subscriber line;
   a third circuit which adjusts the transmission level in response to the control signal; and
   a fourth circuit which supplies the control signal to the second and third circuits.

22. The network terminal as claimed in claim 21, wherein:
   the fourth circuit includes a memory which stores items of data related to combinations of the waveforms and adjustable transmission levels; and
   one of the items of data suitable for the two-wire metallic subscriber line is read from the memory and applied to the second and third circuits as the control signal.

23. The network terminal as claimed in claim 22, wherein:
   the items of data are sequentially selected one by one and are applied to the second and third circuits; and
   one of the items of data used when a receive system of the network terminal is pulled in synchronization based on data received via the two-wire metallic subscriber line is selected as the control signal.

24. The network terminal as claimed in claim 23, wherein said one of the items of data selected as the control data is stored in the memory.

25. The network terminal as claimed in claim 16, further comprising a series regulator source which transforms the electricity from the second two-wire metallic subscriber line to power to be supplied, as a normal feed, to terminal equipment connected to the network terminal.

26. The network terminal as claimed in claim 18, further comprising a DC/DC converter which converts the electricity from the second two-wire metallic subscriber line to power to be supplied, as a normal feed, to terminal equipment connected to the network terminal.

27. The network terminal as claimed in claim 15, wherein the receive amplifier comprises an amplifier having a flat gain characteristic.

28. The network terminal as claimed in claim 15, wherein the receive amplifier comprises an amplifier having a slant gain characteristic.

29. The network terminal as claimed in claim 10, further comprising a reset circuit which resets a given part of the network terminal in a standby mode by detecting a polarity of the two-wire metallic subscriber line in feeding electricity.

* * * * *